(12) United States Patent
Di Mondo

(10) Patent No.: US 11,987,672 B2
(45) Date of Patent: May 21, 2024

(54) WAX AS A MELT FLOW MODIFIER AND PROCESSING AID FOR POLYMERS

(71) Applicant: GreenMantra Recycling Technologies Ltd., Brantford (CA)

(72) Inventor: Domenic Di Mondo, Brampton (CA)

(73) Assignee: GreenMantra Recycling Technologies Ltd., Brantford (CA)

(*) Notice: Subject to any disclaimer, the term of this patent is extended or adjusted under 35 U.S.C. 154(b) by 0 days.

(21) Appl. No.: 17/128,992

(22) Filed: Dec. 21, 2020

(65) Prior Publication Data

US 2021/0108046 A1    Apr. 15, 2021

Related U.S. Application Data

(63) Continuation of application No. 16/140,169, filed on Sep. 24, 2018, now Pat. No. 10,870,739, which is a
(Continued)

(51) Int. Cl.
*C08L 91/06* (2006.01)
*B01J 19/18* (2006.01)
(Continued)

(52) U.S. Cl.
CPC .......... *C08J 11/10* (2013.01); *C08J 3/201* (2013.01); *C08J 11/16* (2013.01); *C08L 23/06* (2013.01);
(Continued)

(58) Field of Classification Search
CPC .............. B01J 19/18; B01J 2219/0004; B01J 2219/00051; C08J 11/10; C08J 11/16;
(Continued)

(56) References Cited

U.S. PATENT DOCUMENTS

| 2,549,538 A | 4/1951 | Sparks et al. |
| 3,033,256 A | 5/1962 | Schrenk |

(Continued)

FOREIGN PATENT DOCUMENTS

| AU | 2017218908 A1 | 8/2018 |
| CA | 2098778 A1 | 12/1993 |

(Continued)

OTHER PUBLICATIONS

U.S. Appl. No. 17/006,903, Office Action dated May 17, 2021 "USOA20210517".
(Continued)

*Primary Examiner* — Frances Tischler
(74) *Attorney, Agent, or Firm* — Cook Alex Ltd.

(57) ABSTRACT

An improved method forms and employs a wax to modify throughputs and melt flow in polymers. The method includes: (a) selecting a solid polymeric material, (b) heating the solid polymeric material in an extruder to produce a molten polymeric material, (c) filtering the molten polymeric material, (d) placing the molten polymeric material through a chemical depolymerization process in a reactor to produce a depolymerized polymeric material, and (e) adding the depolymerized material to a pre-wax mixture to produce a modified polymer.

19 Claims, 6 Drawing Sheets

Related U.S. Application Data continuation of application No. PCT/CA2017/050378, filed on Mar. 24, 2017.

(60) Provisional application No. 62/312,899, filed on Mar. 24, 2016.

(51) Int. Cl.
  *C08J 3/20* (2006.01)
  *C08J 11/10* (2006.01)
  *C08J 11/16* (2006.01)
  *C08L 23/06* (2006.01)

(52) U.S. Cl.
  CPC .............. *C08L 91/06* (2013.01); *B01J 19/18* (2013.01); *B01J 2219/0004* (2013.01); *B01J 2219/00051* (2013.01); *C08J 2323/02* (2013.01); *C08J 2323/06* (2013.01); *C08J 2323/12* (2013.01); *C08J 2491/06* (2013.01)

(58) Field of Classification Search
  CPC .............. C08J 2323/02; C08J 2323/06; C08J 2323/12; C08J 2491/06; C08J 3/201; C08L 23/06; C08L 91/06; Y02W 30/62
  See application file for complete search history.

(56) References Cited

U.S. PATENT DOCUMENTS

| | | | |
|---|---|---|---|
| 3,143,536 A | 8/1964 | Guzzetta et al. |
| 3,278,513 A | 10/1966 | Jahrstorfer et al. |
| 3,332,926 A | 7/1967 | Baron et al. |
| 3,345,352 A | 10/1967 | Baron et al. |
| 3,424,822 A | 1/1969 | Liston |
| 3,441,628 A | 4/1969 | Raetzsch et al. |
| 3,642,722 A | 2/1972 | Knowles et al. |
| 3,927,693 A | 12/1975 | Johnston |
| 3,962,092 A | 6/1976 | Newman |
| 4,053,141 A | 10/1977 | Gussefeld |
| 4,059,525 A | 11/1977 | Krasnow |
| 4,105,806 A | 8/1978 | Watt |
| 4,127,619 A | 11/1978 | Godfrey |
| 4,136,251 A | 1/1979 | Bice et al. |
| 4,178,272 A | 12/1979 | Meyer et al. |
| 4,208,252 A | 6/1980 | Yoshida et al. |
| 4,525,216 A | 6/1985 | Nakanishi |
| 4,620,032 A | 10/1986 | Doerr |
| 4,642,401 A | 2/1987 | Coenen et al. |
| 4,847,209 A | 7/1989 | Lewis et al. |
| 4,911,952 A | 3/1990 | Doane et al. |
| 5,158,982 A | 10/1992 | Stapp |
| 5,292,862 A | 3/1994 | Miura et al. |
| 5,314,741 A | 5/1994 | Roberts et al. |
| 5,315,055 A | 5/1994 | Butcher et al. |
| 5,354,930 A | 10/1994 | Atkins et al. |
| 5,369,215 A | 11/1994 | Platz |
| 5,386,055 A | 1/1995 | Lee et al. |
| 5,481,052 A | 1/1996 | Hardman et al. |
| 5,502,263 A | 3/1996 | Ponsford et al. |
| 5,608,136 A | 3/1997 | Maezawa et al. |
| 5,656,757 A | 8/1997 | Jenczewski et al. |
| 5,672,794 A | 9/1997 | Northemann |
| 5,728,909 A | 3/1998 | Butcher, Jr. |
| 5,731,483 A | 3/1998 | Stabel et al. |
| 5,821,395 A | 10/1998 | Price et al. |
| 5,849,964 A | 12/1998 | Holighaus et al. |
| 5,876,644 A | 3/1999 | Nichols et al. |
| 6,143,940 A | 11/2000 | Miller et al. |
| 6,150,577 A | 11/2000 | Miller et al. |
| 6,172,271 B1 | 1/2001 | Horizoe et al. |
| 6,172,275 B1 | 1/2001 | Tadauchi et al. |
| 6,184,427 B1 | 2/2001 | Klepfer et al. |
| 6,211,331 B1 | 4/2001 | Craig |
| 6,288,296 B1 | 9/2001 | Miller et al. |
| 6,822,126 B2 | 11/2004 | Miller et al. |
| 7,834,226 B2 | 11/2010 | Miller |
| 7,893,307 B2 | 2/2011 | Smith |
| 7,923,506 B2 | 4/2011 | Cohoon et al. |
| 8,168,839 B2 | 5/2012 | Niu |
| 8,609,778 B1 | 12/2013 | Frost et al. |
| 8,664,458 B2 | 3/2014 | Kumar et al. |
| 8,680,167 B2 | 3/2014 | Agarwal et al. |
| 9,090,829 B1 | 7/2015 | McGrevy et al. |
| 9,200,130 B2 | 12/2015 | D'Amato et al. |
| 9,353,476 B2 | 5/2016 | Henriksson et al. |
| 9,631,153 B2 | 4/2017 | Unger et al. |
| 9,714,385 B2 | 7/2017 | Khan et al. |
| 10,000,715 B2 | 6/2018 | Kumar et al. |
| 10,358,603 B1 | 7/2019 | Pour |
| 10,457,602 B1 | 10/2019 | Davis |
| 10,457,886 B2 | 10/2019 | Kumar et al. |
| 10,472,487 B2 | 11/2019 | Gil et al. |
| 10,519,292 B2 | 12/2019 | Yao et al. |
| 10,597,507 B2 | 3/2020 | Di Mondo et al. |
| 10,907,353 B2 | 2/2021 | LaTorre et al. |
| 11,046,613 B2 | 6/2021 | Davis |
| 11,072,676 B2 | 7/2021 | Di Mondo et al. |
| 11,192,999 B2 | 12/2021 | Yao et al. |
| 11,220,586 B2 | 1/2022 | Yao et al. |
| 11,279,811 B2 | 3/2022 | Di Mondo et al. |
| 11,319,493 B2 | 5/2022 | Daggupati et al. |
| 11,499,110 B2 | 11/2022 | Celik et al. |
| 11,518,865 B2 | 12/2022 | Joshi et al. |
| 11,596,935 B2 | 3/2023 | Delferro et al. |
| 11,780,985 B2 | 10/2023 | Delferro et al. |
| 2003/0003554 A1 | 1/2003 | Miller et al. |
| 2003/0154885 A1 | 8/2003 | Krendlinger et al. |
| 2003/0199718 A1 | 10/2003 | Miller |
| 2003/0225213 A1 | 12/2003 | Maehara et al. |
| 2004/0161570 A1 | 8/2004 | Zanchetta et al. |
| 2005/0148487 A1 | 7/2005 | Brownscombe et al. |
| 2005/0176866 A1 | 8/2005 | Krendlinger et al. |
| 2006/0084764 A1 | 4/2006 | Hanna et al. |
| 2007/0117894 A1 | 5/2007 | Bach et al. |
| 2007/0263060 A1 | 11/2007 | Laksin et al. |
| 2008/0207811 A1 | 8/2008 | Brust et al. |
| 2009/0036619 A1 | 2/2009 | Herrmann et al. |
| 2009/0110925 A1 | 4/2009 | Fukuda et al. |
| 2009/0321317 A1 | 12/2009 | Widmer et al. |
| 2010/0227954 A1 | 9/2010 | Naidoo et al. |
| 2010/0233408 A1 | 9/2010 | Zickell et al. |
| 2011/0195256 A1 | 8/2011 | Morikawa et al. |
| 2012/0016169 A1 | 1/2012 | Kumar |
| 2012/0136107 A1 | 5/2012 | Fu et al. |
| 2012/0310023 A1 | 5/2012 | Huang et al. |
| 2012/0165455 A1 | 6/2012 | Vitrano et al. |
| 2012/0296036 A1* | 11/2012 | Allen .................... C08K 5/101 524/585 |
| 2012/0304879 A1 | 12/2012 | Tiessen et al. |
| 2013/0137794 A1 | 5/2013 | Kasper et al. |
| 2013/0137796 A1 | 5/2013 | Kropp |
| 2013/0180431 A1 | 7/2013 | Myszak, Jr. et al. |
| 2013/0303810 A1 | 11/2013 | Handerek |
| 2014/0023870 A1 | 1/2014 | Takamori |
| 2014/0046102 A1 | 2/2014 | D'Amato et al. |
| 2014/0107307 A1 | 4/2014 | Frost et al. |
| 2014/0182194 A1 | 7/2014 | Unger et al. |
| 2014/0299017 A1 | 10/2014 | Parvez et al. |
| 2015/0105494 A1 | 4/2015 | Naidoo et al. |
| 2015/0105496 A1 | 4/2015 | Naidoo et al. |
| 2015/0203731 A1 | 7/2015 | Herrlich et al. |
| 2015/0210611 A1 | 7/2015 | Tippet et al. |
| 2015/0247096 A1 | 9/2015 | Barger et al. |
| 2015/0322263 A1 | 11/2015 | Hilsenbeck |
| 2015/0361374 A1 | 12/2015 | Kumar et al. |
| 2016/0024390 A1 | 1/2016 | Ullom |
| 2016/0040074 A1 | 2/2016 | Methling |
| 2017/0232416 A1 | 8/2017 | Gil et al. |
| 2017/0283525 A1 | 10/2017 | Li et al. |
| 2017/0290945 A1 | 10/2017 | Hanson et al. |
| 2017/0306152 A1 | 10/2017 | Shulga et al. |
| 2018/0127522 A1 | 5/2018 | Land et al. |
| 2018/0312694 A1 | 11/2018 | Naidoo et al. |
| 2018/0371325 A1 | 12/2018 | Streiff et al. |

(56) References Cited

U.S. PATENT DOCUMENTS

| | | |
|---|---|---|
| 2019/0119191 A1 | 4/2019 | Streiff et al. |
| 2020/0172779 A1 | 6/2020 | Di Mondo |
| 2021/0061971 A1 | 3/2021 | Delferro et al. |
| 2021/0087113 A1 | 3/2021 | Di Mondo et al. |
| 2021/0108154 A1 | 4/2021 | Scheibel et al. |
| 2022/0089831 A1 | 3/2022 | Kanattukara et al. |
| 2022/0112352 A1 | 4/2022 | Nagy et al. |
| 2022/0340819 A1 | 10/2022 | Gray et al. |

FOREIGN PATENT DOCUMENTS

| | | |
|---|---|---|
| CA | 2162005 A1 | 5/1996 |
| CA | 2202941 A1 | 10/1998 |
| CA | 2805570 A1 | 1/2012 |
| CA | 2812961 A1 | 1/2012 |
| CA | 2822678 A1 | 2/2014 |
| CA | 2883204 A1 | 3/2014 |
| CA | 2898257 A1 | 7/2014 |
| CA | 3129563 A1 | 7/2014 |
| CA | 2885144 A1 | 3/2015 |
| CA | 2890874 A1 | 11/2015 |
| CA | 2822678 C | 5/2017 |
| CA | 2981710 A1 | 4/2018 |
| CH | 646717 A5 | 12/1984 |
| CN | 1120347 A | 4/1996 |
| CN | 01205390 A | 6/2008 |
| CN | 01205402 A | 6/2008 |
| CN | 101205390 A | 6/2008 |
| CN | 101205396 A | 6/2008 |
| CN | 101205402 A | 6/2008 |
| CN | 101205407 A | 6/2008 |
| CN | 101434821 B | 5/2009 |
| CN | 101502993 A | 8/2009 |
| CN | 101704932 A | 5/2010 |
| CN | 101787102 A | 7/2010 |
| CN | 101970095 A | 2/2011 |
| CN | 102066525 A | 5/2011 |
| CN | 102205220 A | 10/2011 |
| CN | 102989338 A | 3/2013 |
| CN | 103146267 A | 6/2013 |
| CN | 103509496 A | 1/2014 |
| CN | 104449090 A | 3/2015 |
| CN | 103168016 A | 4/2015 |
| CN | 104552735 A | 4/2015 |
| CN | 104847921 A | 8/2015 |
| CN | 104877699 A | 9/2015 |
| CN | 104910511 A | 9/2015 |
| CN | 105102519 A | 11/2015 |
| CN | 105153511 A | 12/2015 |
| CN | 105219406 A | 1/2016 |
| CN | 105315391 A | 2/2016 |
| CN | 106413876 A | 2/2017 |
| CN | 106700975 A | 5/2017 |
| CN | 106753057 A | 5/2017 |
| CN | 107286277 A | 10/2017 |
| CN | 107629565 A | 1/2018 |
| CN | 206983219 U | 2/2018 |
| CN | 108883551 B | 11/2018 |
| CN | 110105474 A | 8/2019 |
| CN | 111607171 A | 9/2020 |
| CN | 112694552 A | 4/2021 |
| CN | 113185626 A | 7/2021 |
| CN | 112779045 B | 10/2021 |
| CN | 113462175 A | 10/2021 |
| CN | 113621189 A | 11/2021 |
| CN | 113751051 A | 12/2021 |
| CN | 115044219 A | 9/2022 |
| CN | 116102742 A | 5/2023 |
| CN | 116162287 A | 5/2023 |
| DE | 1570194 A1 | 8/1969 |
| DE | 3642273 A1 | 4/1987 |
| DE | 19500425 C1 | 4/1996 |
| DE | 69323125 T2 | 8/1999 |
| DE | 10037229 A1 | 2/2000 |
| DE | 10022666 A1 | 11/2001 |
| DE | 102018214702 A1 | 9/2019 |
| EP | 0577279 A1 | 1/1994 |
| EP | 0717094 A1 | 6/1996 |
| EP | 0577279 B1 | 1/1999 |
| EP | 1707614 A1 | 10/2006 |
| EP | 2161299 A1 | 3/2010 |
| EP | 2283094 B1 | 10/2012 |
| EP | 3397442 A1 | 11/2018 |
| EP | 3414295 A1 | 12/2018 |
| EP | 3441136 A1 | 12/2020 |
| EP | 3867312 A1 | 8/2021 |
| EP | 4206306 A1 | 7/2023 |
| ES | 539973 | 4/1986 |
| ES | 539973 A0 | 4/1986 |
| GB | 569043 A | 5/1945 |
| GB | 1310260 A | 3/1973 |
| GB | 1563440 A | 3/1980 |
| GB | 2402397 A | 12/2004 |
| IN | 105153511 A | 12/2015 |
| JP | S48000661 A | 1/1973 |
| JP | S51125412 A | 11/1976 |
| JP | S 59217777 A | 12/1984 |
| JP | S59217777 A | 12/1984 |
| JP | H01150857 A | 6/1989 |
| JP | 03292305 A | 12/1991 |
| JP | H032923505 A | 12/1991 |
| JP | H0457887 A | 2/1992 |
| JP | H04100807 A | 4/1992 |
| JP | H0552849 A | 3/1993 |
| JP | H05085964 A | 4/1993 |
| JP | H06179877 A | 6/1994 |
| JP | H08508520 A | 9/1996 |
| JP | H08253601 A | 10/1996 |
| JP | H11302663 A | 11/1999 |
| JP | H122000512209 A | 9/2000 |
| JP | H142002167466 A | 6/2002 |
| JP | H142002224652 A | 8/2002 |
| JP | H142002256103 A | 9/2002 |
| JP | 2003252676 A | 9/2003 |
| JP | H152003252676 A | 9/2003 |
| JP | H152003292594 A | 10/2003 |
| JP | H162004131675 A | 4/2004 |
| JP | H172005170986 A | 6/2005 |
| JP | H172005200573 A | 7/2005 |
| JP | H172005527672 A | 9/2005 |
| JP | H172005298802 A | 10/2005 |
| JP | H182006056957 A | 3/2006 |
| JP | H182006143802 A | 6/2006 |
| JP | 2007169531 A | 7/2007 |
| JP | H192007169531 A | 7/2007 |
| JP | H192007529574 A | 10/2007 |
| JP | H232011126995 A | 6/2011 |
| JP | H252013539476 A | 10/2013 |
| JP | H272015512965 A | 4/2015 |
| JP | H272015512972 A | 4/2015 |
| JP | H282016523986 A | 8/2016 |
| JP | H292017513964 A | 6/2017 |
| JP | R12019508524 A | 3/2019 |
| KR | 100680677 B1 | 2/2007 |
| KR | 100899029 B1 | 5/2009 |
| KR | 100949381 B1 | 3/2010 |
| KR | 20110051520 A | 5/2011 |
| RO | 131874 A2 | 5/2017 |
| WO | 1989000419 A1 | 1/1989 |
| WO | WO 1989000419 A1 | 1/1989 |
| WO | 2000027942 A1 | 5/2000 |
| WO | WO 2000027942 A1 | 5/2000 |
| WO | 2002090403 A1 | 11/2002 |
| WO | WO 2002090403 A1 | 11/2002 |
| WO | 2005092963 A1 | 10/2005 |
| WO | WO 2005092963 A1 | 10/2005 |
| WO | 2010023173 A1 | 3/2010 |
| WO | WO 2010023173 A1 | 3/2010 |
| WO | 2010081054 A1 | 7/2010 |
| WO | WO 2010081054 A1 | 7/2010 |
| WO | 2010099963 A1 | 9/2010 |
| WO | WO 2010099963 A1 | 9/2010 |
| WO | 2012007833 A2 | 7/2011 |
| WO | WO 2012007833 A2 | 7/2011 |

(56) References Cited

FOREIGN PATENT DOCUMENTS

| WO | 2012007833 A2 | 1/2012 |
|---|---|---|
| WO | WO 2012007833 A2 | 1/2012 |
| WO | 2014110644 A1 | 7/2014 |
| WO | WO 2014110644 A1 | 7/2014 |
| WO | 2014161767 A2 | 10/2014 |
| WO | WO 2014161767 A2 | 10/2014 |
| WO | 2015130545 A1 | 9/2015 |
| WO | WO 2015130545 A1 | 9/2015 |
| WO | 2015164017 A1 | 10/2015 |
| WO | 2015164331 A1 | 10/2015 |
| WO | WO 2015164017 A1 | 10/2015 |
| WO | WO 2015164331 A1 | 10/2015 |
| WO | 2017113020 A1 | 7/2017 |
| WO | WO 2017113020 A1 | 7/2017 |
| WO | 2017136957 A1 | 8/2017 |
| WO | 2017139333 A1 | 8/2017 |
| WO | WO 2017136957 A1 | 8/2017 |
| WO | WO 2017139333 A1 | 8/2017 |
| WO | 2017161463 A1 | 9/2017 |
| WO | WO 2017161463 A1 | 9/2017 |
| WO | 2017167947 A1 | 10/2017 |
| WO | 2018058257 A1 | 4/2018 |
| WO | WO 2018058257 A1 | 4/2018 |
| WO | 2018158285 A1 | 9/2018 |
| WO | WO 2018158285 A1 | 9/2018 |
| WO | 2019041049 A1 | 3/2019 |
| WO | WO 2019041049 A1 | 3/2019 |
| WO | 2019104430 A1 | 6/2019 |
| WO | WO 2019104430 A1 | 6/2019 |
| WO | 2019195915 A1 | 10/2019 |
| WO | WO 2019195915 A1 | 10/2019 |
| WO | 2019227233 A1 | 12/2019 |
| WO | WO 2019227233 A1 | 12/2019 |
| WO | 2021048187 A1 | 3/2021 |
| WO | WO 2021048187 A1 | 3/2021 |
| WO | 2022015971 A1 | 1/2022 |
| WO | 2022167903 A1 | 8/2022 |
| WO | WO 2022167903 A1 | 8/2022 |
| WO | 2023059623 A1 | 4/2023 |
| WO | WO 2023059623 A1 | 4/2023 |
| WO | 2023088861 A1 | 5/2023 |
| WO | WO 2023088861 A1 | 5/2023 |
| WO | 2023121379 A1 | 6/2023 |
| WO | WO2023121379 A1 | 6/2023 |
| WO | 2023141665 A1 | 7/2023 |
| WO | WO 2023141665 A1 | 7/2023 |

OTHER PUBLICATIONS

U.S. Appl. No. 17/073,277, Office Action dated Jun. 7, 2021 "USOA20210607".
EP App. No. 18851118.2, Extended European Search Report dated May 3, 2021 "ESR20210503".
Lai et al., Depolymerization of HDPE to wax in the presence of a Catalyst formed by homonuclear macrocyclic zirconium complex chemically bonded to alumina support, Journal of Molecular Applied Catalysis A: General, 2006, vol. 303(1), pp. 9-17.
Extended European Search Report dated May 3, 2021 issued in connection with EP. App. No. 18851118.2.
International Preliminary Report on Patentability dated Aug. 23, 2018 issued in connection with International App. No. PCT/CA2017/050172.
International Preliminary Report on Patentability dated Oct. 4, 2018 issued in connection with International App. No. PCT/CA2017/050378.
International Search Report and Written Opinion dated Nov. 16, 2018 issued in connection with PCT/CA2018/051058.
International Search Report and Written Opinion dated Feb. 5, 2019 issued in connection with International App. No. PCT/CA2018/051517.
International Preliminary Report on Patentability dated Apr. 11, 2019 issued in connection with International App. No. PCT/CA2017/051166.
Examination Report No. 1 dated May 1, 2019 in connection with Australian App. No. 2018204945.
International Search Report and Written Opinion dated Jul. 4, 2019 issued in connection with International App. No. PCT/CA2019/000046.
International Search Report and Written Opinion dated Jul. 12, 2019 issued in connection with International App. No. PCT/CA2019/050762.
International Search Report and Written Opinion dated Jul. 26, 2019 issued in connection with International App. No. PCT/CA2019/050761.
Extended European Search Report dated Aug. 23, 2019 issued in connection with European App. No. 16880228.8.
Extended European Search Report dated Sep. 4, 2019 issued in connection with European App. No. 17769226.6.
Notice of Acceptance for Patent App. dated Sep. 6, 2019 issued in connection with Australian App. No. 2018204945.
Extended European Search Report dated Oct. 7, 2019 issued in connection with European App. No. 17749885.4.
Office Action dated Jan. 13, 2020 issued in connection with Brazilian App. No. 11 2013 001058 4.
Canadian Office Action dated Jan. 24, 2020 issued in connection with Canadian App. No. 2898257.
Examination Report No. 1 dated Feb. 26, 2020 issued in connection with Australian App. No. 2017239181.
Office Action dated Feb. 28, 2020 issued in connection with Brazilian App. No. 11 2018 013600 0.
Office Action dated Mar. 2, 2020 issued in connection with Chinese App. No. 201680082803.3.
International Preliminary Report on Patentability dated Mar. 3, 2020 issued in connection with International App. No. PCT/CA2018/051058.
International Search Report and Written Opinion dated Mar. 19, 2020 issued in connection with International App. No. PCT/CA2019/051814.
Partial European Search Report dated Mar. 20, 2020 issued in connection with European App. No. 17854306.2.
Office Action dated Apr. 28, 2020 issued in connection with Canadian App. No. 2898257.
Office Action dated May 26, 2020 issued in connection with Japanese App. No. 2018-534826.
International Search Report and Written Opinion dated Jun. 9, 2020 issued in connection with International App. No. PCT/CA2020/050439.
Office Action dated Jun. 15, 2020 issued in connection with Chinese App. No. 201780011193.2.
Extended European Search Report dated Jun. 29, 2020 issued in connection with European App. No. 17854306.2.
Office Action dated Jun. 30, 2020 issued in connection with Japanese App. No. 2018-542700.
Notice of Allowance dated Jul. 1, 2020 issued in connection with Brazilian App. No. 11 2013 001058 4.
Notice of Allowance dated Oct. 13, 2020 issued in connection with Japanese App. No. 2018-534826.
Office Action dated Oct. 22, 2020 issued in connection with Chinese App. No. 201680082803.3.
Office Action dated Nov. 24, 2020 issued in connection with Japanese App. No. 2018-542700.
Canadian Office Action dated Nov. 25, 2020 issued in connection with Canadian App. No. 3096804.
Notice of Acceptance dated Nov. 30, 2020 issued in connection with Australian App. No. 2017239181.
International Search Report and Written Opinion dated Nov. 30, 2020 issued in connection with International App. No. PCT/CA2020/051166.
Extended European Search Report dated Dec. 17, 2020 issued in connection with European App. No. 16880228.8.
PCT/IB2011/001642, International Search Report and Written Opinion dated Jan. 5, 2012 ISR20120105.
PCT/IB2011/001642, International Preliminary Report on Patentability dated Aug. 1, 2012 "IPRP20120801".
PCT/CA2013/000041, International Search Report and Written Opinion dated Sep. 20, 2013 "ISR20130920".

(56) References Cited

OTHER PUBLICATIONS

PCT/CA2013/000041, International Preliminary Report on Patentability dated Jul. 21, 2015 "IPRP20150721".
PCT/CA2016/051555, International Search Report and Written Opinion dated Mar. 17, 2017 "ISR20170317".
PCT/CA2016/051555, International Preliminary Report on Patentability dated Jul. 12, 2018 "IPRP20180712".
PCT/CA2017/050172, International Search Report and Written Opinion dated May 2, 2017 "ISR20170502".
PCT/CA2017/050172, International Preliminary Report on Patentability dated Aug. 23, 2018 "IPRP20180823".
PCT/CA2017/050378, International Search Report and Written Opinion dated Jul. 25, 2017 "ISR20170725".
PCT/CA2017/050378, International Preliminary Report on Patentability dated Oct. 4, 2018 "IPRP20181004".
PCT/CA2017/051166, International Search Report and Written Opinion dated Dec. 15, 2017 "ISR20171215".
PCT/CA2017/051166, International Preliminary Report on Patentability dated Apr. 11, 2019 "ISR20190411".
PCT/CA2018/051058, International Search Report and Written Opinion dated Nov. 16, 2018 "ISR20181116".
PCT/CA2018/051058, International Preliminary Report on Patentability dated Mar. 3, 2020 "IPRP20200303".
PCT/CA2018/051517, International Search Report and Written Opinion dated Feb. 5, 2019 "ISR20190205".
PCT/CA2019/000046, International Search Report and Written Opinion dated Jul. 4, 2019 "ISR20190704".
PCT/CA2019/050761, International Search Report and Written Opinion dated Jul. 26, 2019 "ISR20190726".
PCT/CA2019/050762, International Search Report and Written Opinion dated Jul. 12, 2019 "ISR20190712".
PCT/CA2019/051814, International Search Report and Written Opinion dated Mar. 19, 2020 "ISR20200319".
PCT/CA2020/050439, International Search Report and Written Opinion dated Jun. 9, 2020 "ISR20200609".
PCT/CA2020/051166, International Search Report and Written Opinion dated Nov. 30, 2020 "ISR20201130".
U.S. Appl. No. 12/836,594, Office Action dated Jun. 13, 2013 "USOA20130613".
U.S. Appl. No. 14/761,779, Office Action dated Feb. 13, 2017 "USOA20170213".
U.S. Appl. No. 14/761,779, Notice Allowance dated Feb. 20, 2018 "USOA20180220".
U.S. Appl. No. 15/662,818, Office Action dated Oct. 12, 2018 "USOA20181012".
U.S. Appl. No. 15/662,818, Office Action dated Apr. 18, 2019 "USOA20190418".
U.S. Appl. No. 16/000,590, Office Action dated Jul. 27, 2018 "USOA20180727".
U.S. Appl. No. 16/000,590, Office Action dated Mar. 5, 2019 "USOA20190305".
U.S. Appl. No. 16/000,590, Notice of Allowance dated Jun. 19, 2019 "USNOA20190619".
U.S. Appl. No. 16/101,430, Notice of Allowance dated Nov. 14, 2019 "USNOA20191114".
U.S. Appl. No. 16/134,080, Office Action dated Dec. 18, 2019 "USOA20191218".
U.S. Appl. No. 16/140,169, Office Action May 6, 2020 "USOA20200506".
U.S. Appl. No. 16/140,169, Notice of Allowance dated Aug. 19, 2020 "USNOA20200819".
U.S. Appl. No. 16/293,792, Office Action dated Dec. 11, 2020 "USOA20201211A".
U.S. Appl. No. 16/576,805, Office Action Oct. 24, 2019 "USOA20191024".
U.S. Appl. No. 16/576,805, Office Action dated Jun. 16, 2020 "USOA20200616".
U.S. Appl. No. 16/680,428, Office Action dated Mar. 18, 2020 "USOA20200318".
U.S. Appl. No. 16/680,428, Office Action dated Dec. 11, 2020 "USOA20201211".
U.S. Appl. No. 17/006,903, Office Action dated Nov. 4, 2020 "USOA20201104".
AU App. No. 2017239181, Examination Report No. 1 dated Feb. 1, 26, 2020 "AUOA20200226".
AU App. No. 2017239181, Notice of Acceptance dated Nov. 30, 2020 "AUNOA20201130".
AU App. No. 2018204945, Examination Report No. 1 dated May 1, 2019 "AUER20190501".
AU App. No. 2018204945, Notice of Acceptance for Patent Application dated Sep. 6, 2019. "AUNA20190906".
BR App No. 11 2013 001058 4, Office Action dated Jan. 13, 2020 "BROA20200113".
BR App No. 11 2013 001058 4, Notice of Allowance dated Jul. 1, 2020 "BRNOA20200701".
BR App No. 11 2018 013600 0, Office Action dated Feb. 28, 2020 "BROA20200228".
CA App. No. 2805570, Canadian Office Action dated Oct. 5, 2016 CAOA20161005.
CA App. No. 2898257, Canadian Office Action dated Oct. 6, 2016 "CAOA20161006".
CA App. No. 2898257, Canadian Office Action dated Jan. 24, 2020 "CAOA20200124".
CA App. No. 2898257, Canadian Office Action dated Apr. 28, 2020 "CAOA20200428".
CA App. No. 3096804, Canadian Office Action dated Nov. 25, 2020 "CAOA20201125".
CN App. No. 201180034887.0, Chinese Office Action dated Apr. 4, 2014 "CNOA20140404".
CN App. No. 201510126290.9, Chinese Office Action dated Feb. 29, 2016 "CNOA20160229".
CN App. No. 201680082803.3, Chinese Office Action dated Mar. 2, 2020 "CNOA20200302".
CN App. No. 201680082803.3, Chinese Office Action dated Oct. 22, 2020 "CNOA20201022".
CN App. No. 201780011193.2, Chinese Office Action dated Jun. 15, 2020 "CNOA20200615".
EP App. No. 10172039.9, European Search Report dated Apr. 4, 2011 "ESR20110404".
EP App. No. 10172039.9, Extended European Search Report dated Apr. 15, 2011 "EESR20110415".
EP App. No. 16880228.8, Extended European Search Report dated Aug. 23, 2019 "ESR20190823".
EP App. No. 16880228.8, European Search Report dated Dec. 17, 2020 ESR20201217.
EP App. No. 17749885.4, Extended European Search Report dated Oct. 7, 2019 "ESR20191007".
EP App. No. 17769226.6, Extended European Search Report dated Sep. 4, 2019 "ESR20190904".
EP App. No. 17854306.2, Partial European Search Report dated Mar. 20, 2020 "PESR20200320".
EP App. No. 17854306.2, European Search Report dated Jun. 29, 2020 "EESR20200620".
JP App. No. 2013-519172, Office Action dated Jun. 10, 2015 "JPOA20150610".
JP App. No. 2018-534826, Office Action dated May 26, 2020 "JPOA20200526".
JP App. No. 2018-534826, Notice of Allowance dated Oct. 13, 2020 "JPNOA20201013".
JP App. No. 2018-542700, Office Action dated Jun. 30, 2020 "JPOA20200630".
JP App. No. 2018-542700, Office Action dated Nov. 24, 2020 "JPOA20201124".
MY App. No. 2013000128, Malaysian Office Action dated Oct. 15, 2015 "MYOA20151015".
IN App. No. 316/KOLNP/2013, Indian Office Action dated Nov. 30, 2017 "INOA20171130".
Yu, Peroxide modified polyolefin blends Part 1: Effects on LDPE/PP blends with components with similar initial viscosities, Adv. Polymer Tech., vol. 10(3), 1990, pp. 163-172.
Handbook of Adhesives Technology & Application, Beijing Adhesive Society, Aerospace Press, 1991, pp. 735-736.

(56) References Cited

OTHER PUBLICATIONS

Oldshue, "Fluid Mixing Technology", Chem. Industry Press, 1991, p. 279.
Teh, A Review of polyethylene-polypropylene blend and their compatibilization, Adv. Polymer Tech., vol. 13(1), 1994, pp. 1-23.
Murty et al., Thermal Degradation Hydrogenation of Commodity Plastics and Characterization of their Liquefaction Products, Fuel Processing Technology, Oct.-Dec. 1996, vol. 49, Issues 1-3, pp. 75-90.
Ding et al., Thermal and catalytic degradation of high density polyethylene and commingled post-consumer plastic waste, Fuel Processing Technology, Mar. 1997, vol. 51, Issues 1-2, pp. 47-62.
Uddin et al., Catalytic Degradation of Polyethylene and Polypropylene into Liquid Hydrocarbons with Mesoporous Silica, Microporous and Mesoporous Materials, May 1998, vol. 21, Issues 4-6, pp. 557-564.
Buekens et al., Catalytic plastics cracking for recovery of gasoline-range hydrocarbons from municipal plastic wastes, Resources, Conservation and Recycling, Aug. 1998, vol. 23, Issue 3, pp. 163-181.
Kartalis et al., Recycling of post-used PE packaging film using the restabilization technique, Poly. Degrad. And Stab., 2000, vol. 70(2), pp. 189-197.
Luo et al., Catalytic degradation of high density polyethylene and polypropylene into liquid fuel in a power-particle fluidized bed, Polymer Degradation and Stability, online, 2000, vol. 70(1), pp. 97-102.
Predel, "Pyrolysis of mixed polyolefins in a fluidised-bed reactor and on a pyro-GCMS to yield aliphatic waxes"; Polymer Degradation and Stability, 2000, vol. 70(3), pp. 373-385.
You et al., Liquid-phase catalytic degradation of polyethylene wax over silica modified zeolite catalysts, Polymer Degradation and Stability, 2001, vol. 265(2), pp. 329-336.
Seo et al., Investigation of Catalytic degradation of HDPE by hydrocarbon group type analysis, Journal of Analytical and Applied Pyrolysis, 2003, vol. 70, Issue 2, pp. 97-102.
Mpanza et al., "Influence of Different Waxes on the Physical Properties of Linear Low-density Polyethylene", South Africa J. of Chem., vol. 59, 2006, pp. 48-54.
Lai et al., Development of heterogeneous catalyst by ionically bonding macrocyclic Zr—Zr complex to montmorillonite clay for depolymerization of polypropylene, Journal of Molecular Applied Catalysis A: Chemical, 2007, vol. 265(1-2), pp. 15-24.
Rosa et al., Processing and thermal, mechanical and morphological characterization of post-consumer polyolefins/thermoplastic starch blends, J. of Mat. Sci., 2007, 42(2), pp. 551-557.
Urbaniak et al. "Waxes- Products of Thermal Degradation of Waste Plastics—Obtaining, Capabilities, and Application", Archives of Waste Management and Environmental Protection, vol. 6, 2007, pp. 71-78.
Garcia et al., Recycling extruded polystyrene by dissolution with suitable solvents, J. of Mat. Cycles and Waste Management, 2009, vol. 11(1), pp. 2-5.
Aboulkas, Thermal degradation behaviors of polyethylene and polypropylene. Part 1: pyroloysis kinetics and mechanisms, Energy Conversion and Management, 2010, vol. 51, pp. 1363-1369.
Arabiourrutia, "Characterization of the waxes obtained by the pyrolysis of polyolefin plastics in a conical spouted bed reactor"; Journal of Analytical and Applied Pyrolysis, 2012, vol. 94, pp. 230-237.
Xanthos, Recycling of the #5 polymer, Science, 2012, vol. 337, pp. 700-702.
European Search Report dated Apr. 4, 2011 in connection with European Patent App. No. 10172039.
Extended European Search Report dated Apr. 15, 2011 in connection with European Patent App. No. 10172039.9-2104.
International Search Report and Written Opinion dated Jan. 5, 2012 issued in connection with International App. No. PCTIB2011001642.

International Preliminary Report on Patentability dated Aug. 1, 2012 issued in connection with International App. No. PCTIB2011001642.
International Search Report and Written Opinion dated Sep. 20, 2013 issued in connection with International App. No. PCTCA2013000041.
Office Action dated Apr. 4, 2014 issued in connection with Chinese App. No. 201180034887.0.
Kaitz et al., "Depolymerizable polymers:preparation, applications, and future outlook", MRS Comm., 2015, vol. 5, pp. 191-204.
Office Action dated Jun. 16, 2015 issued in connection with Japanese App. No. 2013-519172.
International Preliminary Report on Patentability dated Jul. 21, 2015 issued in connection with International App. No. PCTCA2013000041.
Office Action dated Oct. 15, 2015 issued in connection with Malaysian Patent App. No. 2013000128.
Office Action dated Feb. 29, 2016 issued in connection with Chinese App. No. 201510126290.9.
Office Action dated Oct. 5, 2016 issued in connection with Canadian App. No. 2805570.
Office Action dated Oct. 6, 2016 issued in connection with Canadian App. No. 2898257.
Gergo, P. et al. "Rheological Investigation of Rubber Bitumen Containing Various Waxes as Warm Mix Additive" Studia UBB Chemia LXII, 2 Tom II, 2017 p. 247-257.
International Search Report and Written Opinion dated Mar. 17, 2017 issued in connection with International App. No. PCTCA2016051555.
International Search Report and Written Opinion dated May 2, 2017 issued in connection with PCT/CA2017/050172.
International Search Report and Written Opinion dated Jul. 25, 2017 issued in connection with International App. No. PCT/CA2017/050378.
Office Action dated Nov. 30, 2017 issued in connection with Indian App. No. 316/KOLNP/2013.
International Search Report & Written Opinion dated Dec. 15, 2017 issued in connection with International App. No. PCT/CA2017/051166.
"Changing the Story of Waste Plastic (Crowdcube presentation)", Feb. 2018, Retrieved from the Internet: https://hkstartupresources.com/wpcontent/uploads/2018/02/recycling-technologies-ltdbusiness- plan.pdf [retrieved on Aug. 22, 2019].
International Preliminary Report on Patentability dated Jul. 12, 2018 in connection with International App. No. PCT/CA2016/051555.
U.S. Appl. No. 17/006,903, Office Action dated Dec. 3, 2021 "USOA20211203".
AU App. No. 2017218908, Notice of Acceptance dated Oct. 20, 2021 "AUNOA20211020".
EP App. No. 16880228.8, European Search Report dated Nov. 11, 2021 "ESR20211111".
EP App. No. 18882986.5, European Search Report dated Oct. 20, 2021 "ESR20211020".
EP App. No. 19810083.6, European Search Report dated Nov. 29, 2021 "ESR20211129".
Takuma, "Production of Aromatic Hydrocarbons by Catalytic Degradation of Polyolefins Over H-Gallosilicate", Ind. Eng. Chem. Res., 2001, pp. 1076-1082.
Lal et al., Depolymerization of HDPE to wax in the presence of a catalyst formed by homonuclear macrocyclic zirconium complex chemically bonded to alumina support, Journal of Molecular Applied Catalysis A: General, 2006, vol. 303(1), pp. 9-17.
Sari et al. "Recycling of Polyolefin Materials", Springer Series on Polymer and Composite Materials, (2016), pp. 315-339.
DiMondo "An Added Benefit (Ceranovus A115 and A125)", Jan. 12, 2017, pp. 1-9, Retrieved from the Internet: https://www.professionalroofing.net/Articles/An-added-benefit [retrieved on Nov. 18, 2021].
"GreenMantra Technologies Introduce Ceranovus Polymer Additives at IRE", Feb. 6, 2018, Retrieved from the Internet https://

(56) References Cited

OTHER PUBLICATIONS www.roofingcontractor.com/articles/92693-greenmantratechnologies-introduce-ceranovus-polymer-additives-at-ire [retrieved on Nov. 18, 2021].
Notice of Acceptance dated Oct. 20, 2021 for Australian App. No. 2017218908.
European Search Report dated Oct. 20, 2021 issued in connection with European App. No. 18882986.5.
European Search Report dated Nov. 11, 2021 issued in connection with European App. No. 16880228.8.
European Search Report dated Nov. 29, 2021 issued in connection with European App. No. 19810083.6.
Office Action dated Feb. 2, 2021 in connection with Chinese Application No. 201780018293.8.
Office Action dated Feb. 9, 2021 in connection with Chinese Application No. 201780011193.2.
Examination Report No. 1 dated Mar. 30, 2021 in connection with Australian application No. 2017333737.
International Search Report and Written Opinion dated Apr. 15, 2021 in connection with International Application No. PCT/CA2020/000141.
Canadian Office Action dated Apr. 20, 2021 issued in connection with Canadian App. No. 3096804.
U.S. Appl. No. 16/803,427, Office Action dated Jun. 21, 2021 "USOA20210621".
AU App. No. 2017218908, Examination Report No. 1 dated Sep. 8, 2021 "AUOA20210908".
BR App No. 11 2018 016499 2, Office Action dated Jul. 5, 2021 "BROA20210705".
BR App No. 11 2018 068992 0, Office Action dated Jul. 29, 2021 "BROA20210729".
BR App No. 11 2019 006300 5, Office Action dated Aug. 12, 2021 "BROA20210812".
CN App. No. 201780059004.9, Chinese Office Action dated Jun. 3, 2021 "CNOA20210603".
EP App. No. 17854306.2, Office Action dated Oct. 5, 2021 "EOA20211005".
JP App. No. 2019-517089, Office Action dated Jul. 6, 2021 "JPOA20210706".
MX. App. No. MX/a/2018/008117, Office Action dated Aug. 30, 2021 "MXOA20210830".
Office Action dated Jun. 3, 2021 in connection with Chinese Application No. 201780059004.9.
Office Action dated Jul. 5, 2021 in connection with Brazilian App. No. 11 2018 016499 2.
Office Action dated Jul. 6, 2021 issued in connection with JP App. No. 2019-517089.
Office Action dated Jul. 29, 2021 in connection with Brazilian App. No. 11 2018 068992 0.
Office Action dated Aug. 12, 2021 in connection with Brazilian App. No. 11 2019 006300 5.
Office Action dated Aug. 30, 2021 in connection with Mexican App. No. MX/a/2018/008117.
Examination Report No. 1 dated Sep. 8, 2021 in connection with Australian application No. 2017218908.
European Office Action dated Oct. 5, 2021 issued in connection with European App. No. 17854306.2.
European Search Report dated Apr. 4, 2011 in connection with European U.S. Appl. No. 10/172,039.
"GreenMantra Technologies Introduces Ceranovus Wax Modifiers for Improved Asphalt Roofing Production and Performance", Sep. 12, 2016 pp. 1-3, Retrieved from the Internet: URL:https://www.prnewswire.com/news-releases/greenmantratechnologies-introduces-ceranovus-wax-modifiers-for-improved-asphaltroofing-production-and-performance [retrieved on Nov. 18, 2021].
European Search Repori dated Oct. 20, 2021 issued in connection with European App. No. 18882986.5.
European Search Repon dated Nov. 11, 2021 issued in connection with European App. No. 16880228.8.

PCT/CA2020/051166, International Preliminary Report on Patentability dated Mar. 1, 2022 "IPRP20220301".
PCT/CA2020/000141, International Preliminary Report on Patentability dated May 17, 2022 "IPRP20220517".
U.S. Appl. No. 17/006,903, Office Action dated Jun. 30, 2022 "USOA20220630".
U.S. Appl. No. 17/085,948, Office Action dated Jun. 30, 2022 "USOA20220301".
AU App. No. 2017333737, Notice of Acceptance dated Jan. 4, 2022 "AUNOA20220104".
BR App No. 11 2020 004155 6, Office Action dated May 13, 2022 "BROA202205 13".
CN App. No. 201780018293.8, Chinese Office Action dated Mar. 2, 2022 "CNOA20220302".
CN App. No. 201780018293.8, Chinese Office Action dated Jun. 21, 2022 "CNOA20220621".
EP App. No. 17769226.6, Examination Report dated Mar. 1, 2022 "EPER20220301".
EP App. No. 19811163.5, European Search Report dated Feb. 16, 2022 "ESR20220216".
EP App. No. 19894673.3, Extended European Search Report dated Jun. 3, 2022 "ESR20220603".
JP App. No. 2019-517089, Office Action dated Apr. 5, 2022 "JPOA20220405".
MX. App. No. MX/a/2018/008117, Office Action dated Mar. 1, 2022 "MXOA20220301".
TH App. No. 1801005835, Thai Office Action dated Jun. 10, 2022 "THOA20220610".
Shang et al., "Pyrolyzed Wax from Recycled Cross-Linked Polyethylene as Warm Mix Asphalt (WMA) Additive for SBS Modified Asphalt", Construction and Building Materials, vol. 25, 2011, pp. 886-891.
Shang et al., "Pyrolyzed Wax from Recycled Cross-Linked Polyethylene as Warm Mix Asphalt (WMA) Additive for SBS Modified Asphalt", Progress in Rubber, Plastics and Recycling Technology, vol. 27, 2011, pp. 133-144.
Tongkao, Practical Technology for Modification of Plastics, China Light Industry Press, Oct. 2012, pp. 44-45 and 49-50.
Sari et al. "Recycling of Polyolefin Materials", Springer Series on Polymer and Composite Materials, (2016).
Sukorez® SU-90, Kolon Industries (Year: 2016).
Notice of Acceptance dated Jan. 4, 2022, issued in connection with Australian Application No. 2017333737.
Extended European Search Report dated Feb. 16, 2022, issued in connection with European Application No. EP 19811163.5.
Examination Report dated Mar. 1, 2022, issued in connection with European Application No. 17769226.6.
International Preliminary Report on Patentability dated Mar. 1, 2022 in connection with International Application No. PCT/CA2020/051166.
Office Action dated Mar. 1, 2022, issued in connection with Mexican Application No. MX/a/2018/008117.
Office Action dated Mar. 2, 2022, issued in connection with Chinese Application No. 201780018293.8.
Office Action dated Apr. 5, 2022, issued in connection with Japanese Application No. 2019-517089.
Office Action dated May 13, 2022, issued in connection with Brazilian Application No. BR 11 2020 004155 6.
International Preliminary Report on Patentability dated May 17. 2022 in connection with International Application No. PCT/CA2020/000141.
Extended European Search Report dated Jun. 3, 2022, issued in connection with European Application No. 19894673.3.
Office Action dated Jun. 10, 2022, issued in connection with Thai Application No. 1801005835.
Office Action dated Jun. 21, 2022, issued in connection with Chinese Application No. 201780018293.8.
International Preliminary Report on Patentability dated March 1. 2022 in connection with International Application No. PCT/CA2020/051166.
Office Action dated Jul. 1, 2022, issued in connection with Brazilian Application No. BR 11 2018 068992 0.

(56) References Cited

OTHER PUBLICATIONS

Office Action dated Jul. 13, 2022, issued in connection with Brazilian Application No. BR 11 2020 010448 5.
Office Action dated Aug. 23, 2022, issued in connection with Brazilian Application No. BR 11 2020 024507 0.
Office Action dated Sep. 23, 2022, issued in connection with Brazilian Application No. BR 11 2019 006300 5.
Office Action dated Nov. 17, 2022, issued in connection with Canadian Application No. 3,013,953.
Extended European Search Report dated Nov. 21, 2022, issued in connection with European Application No. 20784475.4.
Office Action dated Oct. 24, 2022, issued in connection with Brazilian Application No. BR 11 2020 024525 9.
Examination Report dated Dec. 20, 2022, issued in connection with European Application No. 16 880 228.8.
Office Action dated Jan. 13, 2023, issued in connection with Canadian Application No. 3, 129,563.
Office Action dated Feb. 6, 2023, issued in connection with Canadian Application No. 3,009,917.
Extended European Search Report dated Feb. 9, 2023, issued in connection with European Application No. 22179677.4.
Simnofske, D. et al. "Benefits of F-T Wax Based Warm Asphalt Mixes for Short-Term Binder Aging and Pavement Durability", Jun. 1, 2016, Proceedings of 6th Eurasphalt & Europbitume Congress.
Perez, Ignacio et al., "Use of Lignin Biopolymer From Industrial Waste as Bitumen Extender for Asphalt Mixtures", Journal of Cleaner Production, vol. 220, pp. 87-98, XP085643290, ISSN: 0959-6526, DOI: 10.1016/J.JCEPRO.2019.02.08.
White, "Laboratory Evaluation of Asphalt Containing Recycled Plastic as a Bitumen Extended and Modifier", Oct. 28, 2019, Journal of Traffic and Transportation Engineering, vol. 7, No. 5, retrieved from the internet: https://www.researchgate.net/profile/Greg-White/publication/337210894_Laboratory_Evaluation_of_Asphalt_Containing_Recycled_Plastic_as_a_Bitumen_Extender_and_Modifier.pdf.
Office Action dated Mar. 20, 2023, issued in connection with Canadian Application 3,015,859.
Office Action dated Apr. 25, 2023, issued in connection with Mexican Application No. MX/a/2018/009808.
Examination Report dated May 17, 2023, issued in connection with European Application No. 20858584.4.
Office Action dated May 19, 2023, issued in connection with Mexican Application No. MX/a/2018/011492.
Office Action dated May 23, 2023, issued in connection with Japanese Application No. 2020-566670.
Office Action dated Jul. 6, 2023, issued in connection with Chinese Application No. 2018800763856.
Office Action dated Aug. 16, 2023, issued in connection with Canadian Application No. 3,013,953.
Extended European Search Report dated Aug. 24, 2023, issued in connection with European Application No. 20858584.4.
U.S. Appl. No. 17/543,733, Office Action dated Aug. 31, 2023 "USOA20230831".
U.S. Appl. No. 18/091,345, Office Action dated Sep. 29, 2023 "USOA20230929".
BR App No. 11 2020 024507 0, Office Action published on Aug. 15, 2023 "BROA20230815".
BR App. No. 11 2021 019925 0, Office Action dated Sep. 13, 2023 "BROA20230913".
CN App. No. 201980043504.2, Chinese Office Action dated Sep. 4, 2023 "CNOA20230904".
MX App. No. MX/a/2018/011492. Office Action dated Sep. 27, 2023 "MXOA20230927".
Halley et al., "Chemorheology of Polymers—From Fundamental Principles to Reactive Processing", Cambridge University Press, 2009, pp. 1-168.
"GreenMantra Technologies Introduces Ceranovus Wax Modifiers for Improved Asphalt Roofing Production and Performance", Sep. 12, 2016 pp. 1-3, Retrieved from the Internet:https://www.prnewswire.com/news-releases/greenmantratechnologies-introduces-ceranovus-wax-modifiers-for-improved-asphaltroofing-production-and-performance [retrieved on Nov. 18, 2021].
Ferraz et al., "Polystyrene recycling processes by dissolution in ethyl acetate", Journal of Applied Polymer Science, 2018.
Office Action published Aug. 15, 2023, issued in connection with Brazilian Application No. BR 11 2020 024507 0.
Office Action dated Sep. 4, 2023, issued in connection with Chinese Application No. 201980043504.2.
Office Action dated Sep. 13, 2023, issued in connection with Brazilian Application No. BR 11 2021 019925 0.
Office Action dated Sep. 27, 2023, issued in connection with Mexican Application No. MX/a/2018/011492.
U.S. Appl. No. 16/840,414, Office Action dated Aug. 22, 2023 "USOA20230822".
U.S. Appl. No. 17/361,329, Notice of Allowance dated Jun. 13, 2023 "NOA20230613".
U.S. Appl. No. 17/363,009, Notice of Allowance dated Aug. 9, 2023 "NOA20230809".
U.S. Appl. No. 17/671,564, Office Action dated Aug. 17, 2023 "USOA20230817".
CA App. No. 3013953, Canadian Office Action dated Aug. 16, 2023 "CAOA20230816".
CA App. No. 3,015,859, Canadian Office Action dated Mar. 20, 2023 "CAOA20230320".
CN App. No. 201880076385.6, Chinese Office Action dated Jul. 6, 2023 "CNOA20230706".
EP App. No. 20858584.4, Examination Report dated May 17, 2023 "EPO20230517".
EP App. No. 20858584.4, Extended European Search Report dated Aug. 24, 2023 "ESR20230824".
JP App. No. 2020-566670, Office Action dated May 23, 2023 "JPOA20230523".
MX App. No. MX/a/2018/009808, Office Action dated Apr. 25, 2023 "MXOA20230425".
MX App. No. MX/a/2018/011492, Office Action dated May 19, 2023 "MXOA20230519".
Tordella et al., "Isomorphic Interactions of Ethylenic Polymers and Paraffin Wax", J. of Polymer Science, vol. 8, 1970, pp. 81-87.
Requena et al. "Encapsulation of Leu-Enkephalin in core-shell isobutylcyanoacrylate-thiolated chitosan nanoparticles for oral administration", J. Chilean Chem. Soc., 2008, vol. 53(4), pp. 1677-1681.
"SCRA Spinout Case Study- Recycling Technologies", Sep. 2015, pp. 1-3, Retrieved from the Internet: https://warwick.ac.uk/fac/crossfac/sciencecity/casestudies/recycling-technologies/ [retrieved on Aug. 22, 2019].
Extended European Search Report dated Nov. 14, 2023, issued in connection with European Application No. 20898302.3.
Office Action dated Dec. 1, 2023, issued in connection with MX/a/2019/003575.
Office Action dated Dec. 12, 2023, issued in connection with Japanese Application No. 2021-533652.
U.S. Appl. No. 17/083,681, Office Action dated Dec. 18, 2023.
EP App. No. 20898302.3, European Search Report dated Nov. 14, 2023.
JP App. No. 2021-533652, Office Action dated Dec. 12, 2023.
MX Appn. No. MX/a/2019/003575, Office Action dated Dec. 1, 2023.
Farahanchi et al., Effects of ultrahigh speed twin screw extrusion on the thermal and mechanical degradation of polystyrene, Polymer Engineering, 2016, vol. 6(7), pp. 743-751.
Office Action dated Jan. 16, 2024, issued in connection with Japanese Application No. 2020-566670.
Examination Report dated Mar. 5, 2024, issued in connection with European Application No. 18851118.2.
Extended European Search Report dated Mar. 25, 2024, issued in connection with European Application No. 23208314.7.

* cited by examiner

US 11,987,672 B2

WAX AS A MELT FLOW MODIFIER AND PROCESSING AID FOR POLYMERS

CROSS-REFERENCE TO RELATED APPLICATIONS

This application is a continuation of and claims priority to U.S. patent application Ser. No. 16/140,169 filed on Sep. 24, 2018 and entitled "Wax as a Melt Flow Modifier and Processing Aid for Polymers". The '169 is a continuation of and claims priority benefits from International application No. PCT/CA2017/050378 filed on Mar. 24, 2017 also entitled, "Wax as a Melt Flow Modifier and Processing Aid for Polymers" which, in turn, claims priority benefits from U.S. provisional patent application No. 62/312,899 filed on Mar. 24, 2016, also entitled "Wax as a Melt Flow Modifier and Processing Aid for Polymers". The '169, '378 and '899 applications are each hereby incorporated by reference herein in their entireties.

FIELD OF THE INVENTION

The present invention relates to a method of creating synthetic waxes from plastic material, and using the waxes to modify new plastics in the processing stage. In particular polyethylene plastics, virgin or recycled, can be modified with waxes to change both their processing throughput and physical properties such as melt flow index. Increasing throughput, improves both operation efficiency, and reduces manufacturing costs. The addition of wax impacting throughput is also tied to a reduction in extruder backpressure, meaning less equipment wear. The changes to physical properties, including improving the flow or viscosity of the polymer, have benefits in various fields including injection molding, blow molding, rotational molding, compression molding, casting, calendaring, blending, milling, and granulation.

BACKGROUND OF THE INVENTION

Additives in polymer processing are commonplace. However, use of polyethylene wax to improve the throughput, physical properties and processability of polyethylene has not seen extensive use, particularly with recycled streams. Typical constraints include high cost, and poor blending of polyethylene wax and the polymer.

In recent times, there have been considerable efforts to convert polymeric solid wastes into useful products. Existing conversion processes are not efficient and can release green-house gases into the environment.

A low cost method of producing wax that can be employed to achieve improved processing and more desirable physical characteristics of specific polymers, while ensuring good blending of the polyethylene polymer and the polyethylene wax additive is needed. Such a method would ideally employ a readily available inexpensive feedstock, preferably recyclable material and use an economical process.

SUMMARY OF THE INVENTION

A method for forming a wax and employing the wax to modify polymeric processing and material properties includes selecting a solid polymeric material; heating the solid polymeric material in an extruder to produce a molten polymeric material; filtering the molten polymeric material; placing the molten polymeric material through a chemical depolymerization process in a reactor to produce a depolymerized wax material; adding the depolymerized wax material into a pre-wax mixture to produce a modified polymer with an increased melt flow index; filtering the solid polymeric material; cooling the depolymerized polymeric material; purifying said depolymerized polymeric material; and/or employing gas and oil produced during purification of the depolymerized polymeric material as fuel for at least one step of the method.

In some embodiments, the method is continuous or semi-continuous.

In certain embodiments, the polymeric material is one or more of high-density polyethylene, low density polyethylene, linear low-density polyethylene and polypropylene. In some embodiments, the polymeric material and/or the pre-wax mixture contains recycled plastics.

In some embodiments, the purifying step is not needed or employs one of flash separation, absorbent beds, clay polishing and film evaporators. In certain embodiments, the depolymerized material is added to the pre-wax mixture via an in-line pump. In certain embodiments, the filtering step employs a screen changer and/or a filter bed.

In some embodiments, the depolymerization process employs a catalyst and/or a second reactor. In certain embodiments, the catalyst is supported on zeolite and/or alumina. In some embodiments, the reactors are connected in series. In some embodiments, the reactors are stacked vertically. In some embodiments, the reactor comprises a static mixer.

In some embodiments, the pre-wax mixture comprises the solid polymeric material.

DETAILED DESCRIPTION OF PREFERRED EMBODIMENT(S)

A process of converting polymeric material, such as waste polymeric material, into wax is described below. This wax can then be employed to modify polymers. Waxes are compatible with a wide variety of polymer material additives, and can be combined with a variety of materials commonly employed to improve the quality of polymers.

In some embodiments, the addition of the wax improves the processing characteristics of the polymer mixture, including improving lubrication of the extruder or processing device which melts the mixture, and increasing the kilogram per hour throughput of the extruder.

In other or the same embodiments, the addition of wax improves the physical characteristics of the final product. The resulting final products can have various properties that differ from their unmodified forms. In some embodiments, the properties include, among other things, changes in their melt flow indexes (MFI), which in turn modifies the viscosity of the polymer and leads to changes in flow rate when the polymer is in liquid form.

Some embodiments involve at least two main concepts (1) the creation of a synthetic wax via depolymerization of plastics and then (2) adding this wax to modify another plastic. In some embodiments, the plastic stock employed to produce the synthetic wax is the same stock employed to produce the end product plastic.

Figure 1:
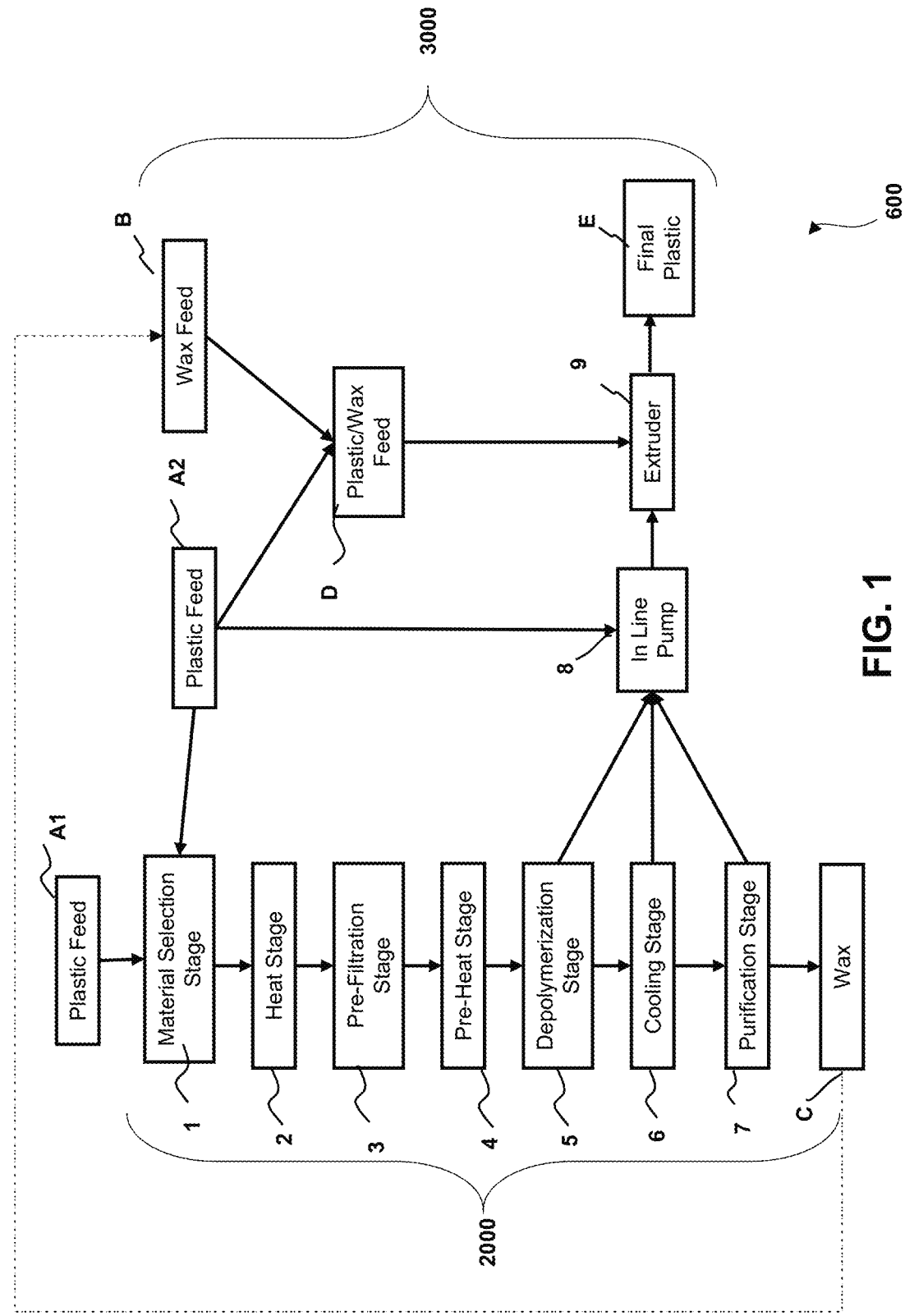
FIG. 1 is a flowchart illustrating a process for creating a wax and using it as a melt flow modifier in polymers.

FIG. 1 illustrates Process 600 for creating synthetic waxes and then using those waxes to modify polymers. Process 600 can be run in batches, but more preferably is a continuous process. The parameters of Process 600, including but not limited to temperature, flow rate of plastic and total number of pre-heat, reaction, or cooling segments, can be modified to produce end products of varying molecular weights and structural properties. For example, raising the temperature and/or decreasing the flow rate through Wax Creation Stage 2000 will result in waxes of a lower molecular weight. Wax Creation Stage 2000 allows for precise targeting of specific wax characteristics, such as those that maximize the desire effect of blending.

In Material Selection Stage 1, polymeric feed is selected and/or prepared for treatment. In some embodiments, the polymeric feed is sorted/selected to include polyethylene material. The polymer can be HDPE, LDPE, LLDPE, and/or other variations of polyethylene.

In other embodiments, the polymeric feed in sorted/selected to include polypropylene material. In other embodiments, the polymeric feed is sorted/selected to include both polyethylene and polypropylene material. In some embodiments, the feed can contain up to 20% polypropylene, lower levels of polystyrene PET, EVA, PVC, EVOH, and undesirable additives and/or contaminants, such as fillers, dyes, metals, various organic and inorganic additives, moisture, food waste, dirt, or other contaminating particles.

In some embodiments, the material selected in Material Selection Stage 1 comprises recycled plastics. In other or the same embodiments, the material selected in Material Selection Stage 1 comprises recycled plastics and/or virgin plastics.

The polymeric feed for Material Selection Stage 1 can come from either Plastic Feed A1 or Plastic Feed A2. When the feed comes from Plastic Feed A2, the resulting wax can have a similar composition when it is added with more plastic from Plastic Feed A2 to create Final Plastic E. This leads to a more homogenous product with improved throughput and melt flow modification.

In some embodiments, the material selected in Material Selection Stage 1 is heated in an extruder in Heat Stage 2 and undergoes Pre-Filtration Process 3. In some embodiments, the extruder is employed to increase the temperature and/or pressure of the incoming plastic and/or is employed to control the flow rates of the plastic. In some embodiments, the extruder is complimented by or replaced entirely by a pump/heater exchanger combination.

Pre-Filtration Process 3 can employ both screen changers and/or filter beds, along with other filtering techniques/devices to remove contaminants from and purify the heated material. The resulting filtered material is then moved into an optional Pre-Heat Stage 4 which brings the filtered material to a higher temperature before it enters Depolymerization Stage 5. Pre-Heat Stage 4 can employ, among other devices and techniques, static mixers and/or heat exchangers such as internal fins and/or heat pipes.

Material in Depolymerization Stage 5 undergoes depolymerization. This depolymerization can be a purely thermal reaction or it can employ catalysts. Depending on the starting material and the desired end product, depolymerization can be employed for a slight or extreme reduction of the molecular weight of the starting material.

In some embodiments, the catalyst employed is a zeolite or alumina supported system or a combination of the two. In some embodiments, the zeolite contains aluminum oxide. In some embodiments, the catalyst is prepared by binding a ferrous-copper complex to an alumina or zeolite support and reacting it with an inorganic acid.

Depolymerization Stage 5 can employ a variety of techniques/devices including, among other things, horizontal and/or vertical fixed bed reactors, and/or static mixers. In some embodiments, Reaction Stage 5 employs multiple reactors and/or reactors divided into multiple sections to produce a semi-continuous or continuous process.

After Depolymerization Stage 5, the depolymerized material either enters Cooling Stage 6 or is pumped via In-line Pump 8 directly into Extruder 9 where it is mixed with plastic from Plastic Feed A2 to create Final Plastic E.

Cooling Stage 6 can employ heat exchangers, along with other techniques/devices to bring the depolymerized material down to a workable temperature before it enters optional Purification Stage 7 or is pumped via In-line Pump 8 and mixed with plastic from Plastic Feed A2 to create Final Plastic E.

In some embodiments, cleaning/purification of the material via such methods such as nitrogen stripping occurs before Cooling Stage 6.

Purification Stage 7 involves the refinement and/or decontamination of the depolymerized material. Techniques/devices that can be employed in Purification Stage 7 include, but are not limited to, flash separation, absorbent beds, clay polishing, distillation, vacuum distillation and/or filtration to remove solvents, oils, color bodies, ash, inorganics, and/or coke.

In some embodiments, a thin or wiped film evaporator is employed to remove gas, oil, and/or grease from the depolymerized material. In some embodiments, the oil, gas and grease can in turn be burned to help run various Stages of Process 2000.

In some embodiments, the purified material is pumped via In-line Pump 8 directly into Extruder 9 where it is mixed with plastic from Plastic Feed A2 to create Final Plastic E. In other embodiments, the purified material is processed as a solid Wax C that can then be employed as Wax Feed B in Plastic Modification Stage 3000.

Wax Creation Stage 2000 ends at Wax C in which the initial starting material selected in Material Selection Stage 1 has been turned into Wax C. In at least some embodiments, Wax C is included as part of Wax Feed B. In some embodiments, Wax C is not highly branched and instead has a more linear structure.

Plastic Modification Stage 3000 involves combining plastic from Plastic Feed A2 with a synthetic wax. In some embodiments, the synthetic wax is taken from Wax Feed B and mixed together with Plastic from Plastic Feed A2 to form Plastic/Wax Feed D which is then sent to Extruder 9 before becoming Final Plastic E. In some embodiments, the wax in Wax Feed B was created via Wax Creation Stage 2000. In some embodiments, the percentage of wax in the wax/plastic compound is roughly 1 to 8 percent.

In other embodiments, plastic from Plastic Feed A2 is mixed directly with hot wax coming from Wax Creation Stage 2000. This method allows for several steps in the process to be eliminated such as cooling the wax (Cooling Stage 6) and/or transporting the wax from one location to another.

Figure 2:
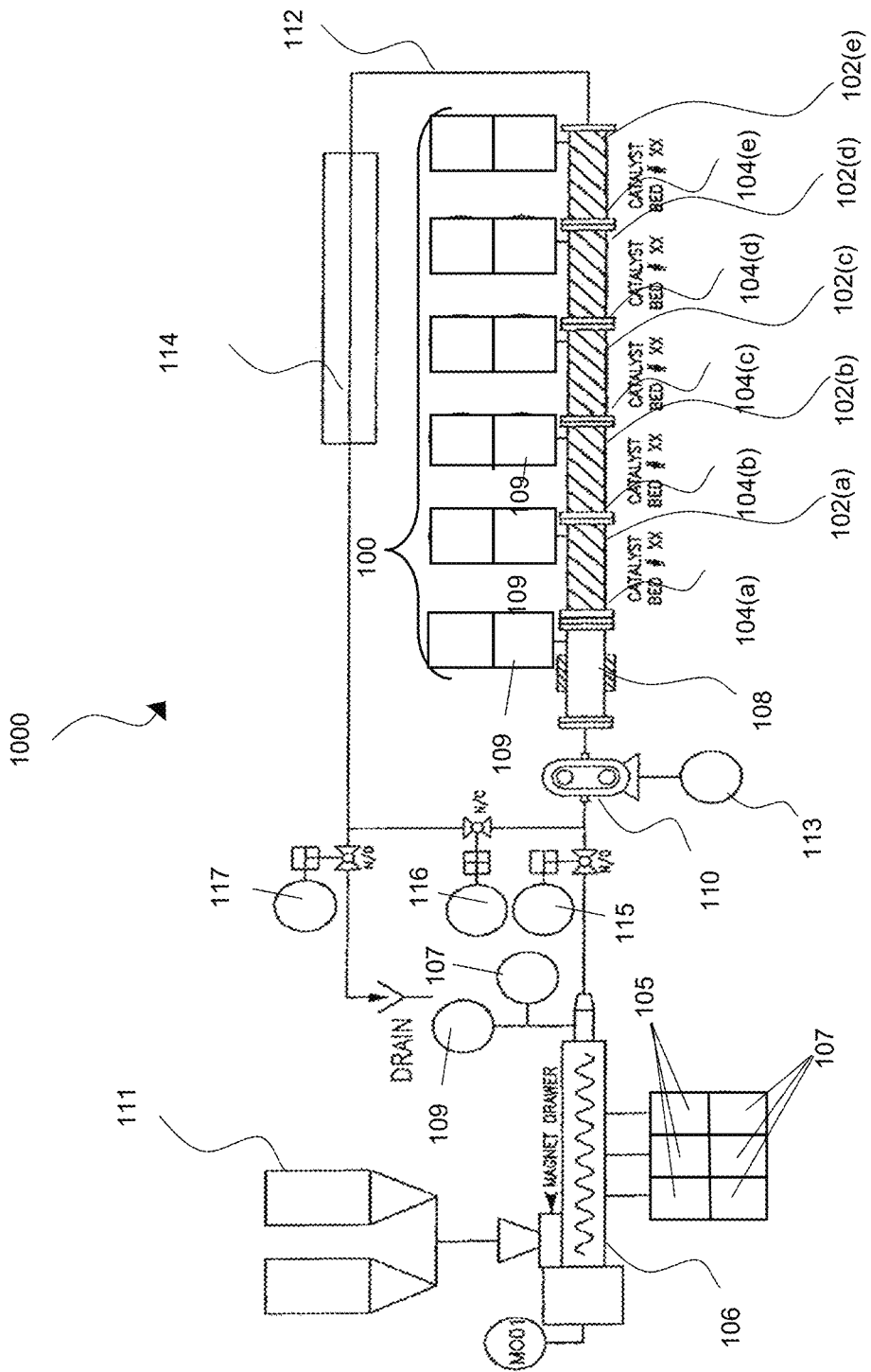
FIG. 2 is a schematic diagram of a system for producing wax from plastic feedstocks.

Referring to FIG. 2, System 1000 includes reactor 700 with five reactor modules 102(a) through 102(e). Reactor modules 102 can vary in dimensions and/or be connected in parallel and/or series. In other embodiments, various numbers of reactor modules 102 can be employed. The ability to customize the number of reactor modules 102 allows for greater control of the amount of depolymerization. System 1000 is often employed in Wax Creation Stage 2000.

System 1000 can include hopper 111 for receiving polymeric material and/or directing the supply of the polymeric material to optional extruder 106. In some embodiments, extruder 106 processes the polymeric material received from hopper 111 by generating a molten polymeric material. The temperature of the polymeric material being processed by extruder 106 is controlled by modulating the level of shear and/or the heat being applied to the polymeric material by extruder heater(s) 105. Extruder heaters can use a variety of heat sources including, but not limited to, electric, thermal fluids, and/or combustion gases. The heat can be modulated by a controller, in response to temperatures sensed by temperature sensor(s) 107.

In some embodiments, pressure sensor 109 measures the pressure of the molten polymeric material being discharged from extruder 106, to prevent, or at least reduce, risk of pressure spikes. The discharged molten polymeric material can be pressurized by pump 110 to facilitate its flow through heating zone 108 and reactor 100. While flowing through reactor 100, the reactor-disposed molten polymeric material can contact a catalyst material which causes depolymerization.

Pressure sensor(s) 109 and/or temperature sensor(s) 107 can also be employed to measure temperature and/or pressure, respectively, of the reactor-disposed molten polymeric material as it flows through reactor 100. Pressure sensor(s) 109 can monitor for plugs before and/or after each reaction zones. Pressure sensor(s) 109 can also maintain system pressure below a maximum pressure such as the maximum pressure of reactor 700 is designed for. Over-pressure can be controlled by feedback from pressure transmitter 109 to a controller which transmits a command signal to shut down extruder 106 and pump 110, and thereby prevent the pressure from further increasing.

In cases when shutdown of extruder 106 does not relieve the over pressure, dump valve 117 can be opened into a container to remove material from system 1000 and avoid an over pressure situation. During shutdown dump valve 117 can be opened to purge system 1000 with nitrogen to remove leftover material to avoid clogs and degraded material during the next start up.

System 1000 can also include a pressure relief device, such as a relief valve or a rupture disk, disposed at the outlet of extruder 106, to relieve pressure from system 1000, in case of over-pressure.

Temperature sensor(s) 107 can facilitate control of the temperature of the reactor-disposed molten polymeric material being flowed through reactor 100. This allows more precise control of the chemical reaction and the resulting polymerization. Temperature sensor(s) 107 also aid in maintaining the temperature below a predetermined maximum temperature, for example the maximum design temperature of reactor 100.

The temperature is controlled by a controller (not shown), which modulates the heat being applied by heaters 118 disposed in heat transfer communication with reaction zones 102(a) through 102(e) of reactor 100, in response to the temperatures sensed by temperature sensor(s) 119.

System 1000 can also include a pressure relief device, such as a relief valve or a rupture disk, disposed at the outlet of extruder 106, to relieve pressure from system 10, in case of over-pressure.

Flow control can also be provided for within system 1000. In some embodiments, system 1000 includes valve 115, disposed at the discharge of extruder 106, for controlling flow from extruder 106 to other unit operations within system 1000. Valve 116 facilitates recirculation. Valve 117 enables collection of product.

During operation, valve 115 can be closed in order to recirculate the molten polymeric material and increase the temperature of the molten polymeric material to a desired temperature. In this case valve 116 would be open, valve 117 would be closed, extruder 106 would be "OFF", and pump 110 would be recirculating.

Generated molten product material 112 is cooled within heat exchanger 114, which can be, among other ways, water jacketed, air cooled, and/or cooled by a refrigerant. A fraction of the cooled generated molten product material can be recirculated (in which case valve 116 would be open), for reprocessing and/or for energy conservation.

In some embodiments, system 1000 is configured for purging by nitrogen to mitigate oxidation of the molten product.

In System 1000 reactor 700 includes one or more reactor modules. Each reactor modules includes a respective module reaction zone in which the reactor-disposed molten polymeric material is brought into contact with a catalyst material over a module-defined residence time, thereby causing depolymerization of the flowing reactor-disposed molten polymeric material. In some of these embodiments, the module-defined residence time of at least two of the reactor modules is the same or substantially the same. In some of these embodiments, at least some of the plurality of module-defined residence times are different. In some embodiments, the catalyst material of at least two of the reactor modules is the same or substantially the same. In other embodiments, the catalyst material of at least two of the reactor modules is different.

In some embodiments, each of the reactor modules includes a reactor-disposed molten polymeric material-permeable container that contains the catalyst material. The container can be configured to receive molten polymeric material such that at least partial depolymerization of at least a fraction of the received molten polymeric material is affected by the catalyst material, and to discharge a molten product material that includes depolymerization reaction products (and can also include unreacted molten polymeric material and intermediate reaction products, or both). Flowing of the reactor-disposed molten polymeric material through the reactor-disposed molten polymeric material-permeable container affects contacting between the catalyst material and the reactor-disposed molten polymeric material, for affecting the at least partial depolymerization of at least a fraction of the reactor-disposed molten polymeric material. In this respect, the flowing reactor-disposed molten polymeric material permeates through the catalyst material within the container, and while permeating through the catalyst material, contacts the catalyst material contained within the container, for affecting the at least partial depolymerization of at least a fraction of the reactor-disposed molten polymeric material.

In System 1000 a first reactor is assembled from the reactor modules. The first reactor has a first reaction zone and includes a total number of "P" reactor modules from "N" reactor modules, wherein "N" is a whole number that is greater than or equal to one.

Each one of the "N" reactor modules defines a respective module reaction zone including a catalyst material disposed therein, and is configured for conducting a flow of reactor-disposed molten polymeric material through the respective module reaction zone, such that, flowing of the reactor-disposed molten polymeric material through the respective module reaction zone brings it into contract with the catalyst material, thereby causing at least partial depolymerization of at least a fraction of the flowing reactor-disposed molten polymeric material. In this respect, the first reaction zone includes "P" module reaction zones.

When "N" is a whole number that is greater than or equal to two, each one of the "N" reactor modules is configured for connection, in series, to one or more of the other "N" reactor modules such that a plurality of reactor modules are connected to one another, in series, and includes a plurality of module reaction zones that are disposed in fluid communication within one another, in series, such that the total number of module reaction zones correspond to the total number of connected reactor modules. The plurality of connected reactor modules is configured for conducting a flow of reactor-disposed molten polymeric material through the plurality of module reaction zones, such that it comes into contact with the catalyst material, thereby affecting at least partial depolymerization of at least a fraction of the flowing reactor-disposed molten polymeric material.

When "P" is a whole number that is greater than or equal to two, the assembling of the first reactor includes connecting the "P" reactor modules to one another, in series, such that "P" reaction zones are disposed in fluid communication with one another in series.

In the embodiment illustrated in FIG. 2, "P" is equal to five, such that reactor 700 includes five reactor modules 102(a) through 102(e), the reaction zone consisting of five module reaction zones 104(a) through 104(e), each one respective to a one of the five reactor modules. "P" can be more or less than five.

Molten polymeric material, for supplying to the constructed reactor, is generated by heating a polymeric material. In some embodiments, the heating is caused by a heater. In FIG. 2 the heating is produced by a combination of extruder 106 and separate heater 108. In such embodiments, the generated molten polymeric material is forced from the extruder, flowed through a separate heater, and then supplied to the module reaction zone. In some embodiments, the extruders are configured to supply sufficient heat to the polymeric material such that the generated molten polymeric material is at a sufficiently high temperature for supply to the reactor, and a separate heater is not required.

In FIG. 2, pump 110 receives molten polymeric material from extruder 106 and affects transport (or flowing) of the molten polymeric material through heater 108, and then through the first reaction zone. In some embodiments, extruder 106 is configured to impart sufficient force to affect the desired flow of the generated molten polymeric material, such that pump 110 is optional.

In some embodiments, the molten polymeric material is derived from a polymeric material feed that is heated to affect generation of the molten polymeric material. In some embodiments, the polymeric material feed includes primary virgin granules of polyethylene. The virgin granules can include low density polyethylene (LDPE), linear low density polyethylene (LLDPE), high density polyethylene (HDPE), polypropylene (PP), or a mixture including combinations of LDPE, LLDPE, HDPE, and PP.

In some embodiments, the polymeric material feed includes waste polymeric material feed. Suitable waste polymeric material feeds include mixed polyethylene waste, mixed polypropylene waste, and a mixture including mixed polyethylene waste and mixed polypropylene waste. The mixed polyethylene waste can include low density polyethylene (LDPE), linear low density polyethylene (LLDPE), high density polyethylene (HDPE), polypropylene (PP), or a mixture including combinations of LDPE, LLDPE, HDPE and PP. In some embodiments, the mixed polyethylene waste can include film bags, milk jugs or pouches, totes, pails, caps, agricultural film, and packaging material. In some embodiments, the waste polymeric material feed includes up to 10 weight % of material that is other than polymeric material, based on the total weight of the waste polymeric material feed.

The molten polymeric material is supplied to the reactor, and the molten polymeric material is flowed through the first reaction zone (i.e. including the "P" reaction zones) as reactor-disposed molten polymeric material. The flowing of the reactor-disposed molten polymeric material through the first reaction zone brings it into contact with the catalyst material generating a molten product material, including a depolymerization product material (and, in some embodiments, also includes unreacted molten polymeric material and/or intermediate reaction products). The molten product material is then collected.

In some embodiments, the catalyst is prepared by binding a ferrous-copper complex to an alumina support and reacting it with an inorganic acid to obtain the catalyst material. Other suitable catalyst materials include zeolite, mesoporous silica, alumina, H-mordenite and various combinations. The system can also be run in the absence of a catalyst and produce waxes through thermal degradation.

The generated molten product material is discharged from and collected/recovered from the reactor. In some embodiments, the collection of the molten product material is affected by discharging a flow of the molten product material from the reactor. In those embodiments, with a plurality of reactor modules, the molten product material is discharged from the first reactor module and supplied to the next reactor module in the series for affecting further depolymerization within the next reactor module in the series, and this continues as-between each adjacent pair of reactor modules in the series.

In some embodiments, the generated depolymerization product material includes waxes, greases, oils, fuels, and C1-C4 gases, and grease-base stocks. Commercially available greases are generally made by mixing grease base stocks with small amounts of specific additives to provide them with desired physical properties. Generally, greases include four types: (a) admixture of mineral oils and solid lubricants; (b) blends of residuum (residual material that remains after the distillation of petroleum hydrocarbons), uncombined fats, rosin oils, and pitches; (c) soap thickened mineral oils; and (d) synthetic greases, such as poly-alpha olefins and silicones.

In some embodiments, the polymeric feed material is one of, or a combination of, virgin polyethylene (any one of, or combinations of, HDPE, LDPE, LLDPE and medium-density polyethylene (MDPE)), virgin polypropylene, or post-consumer, or post-industrial, polyethylene or polypropylene (exemplary sources including bags, jugs, bottles, pails, and/or other items containing PE or PP), and it is desirable to convert such polymeric feed material into a higher melting point wax (having a melting point from 106° C. to 135° C.), a medium melting point wax (having melting point from 86° C. to 105° C.), and a lower melting point wax (having a melting point from 65° C. to 85° C.), an even lower melting point wax (having a melting point from 40° C. to 65° C.), using an embodiment of the system disclosed herein.

In each case, the conversion is effected by heating the polymeric feed material so as to generate molten polymeric material, and then contacting the molten polymeric material with the catalyst material within a reaction zone disposed at a temperature of between 325° C. and 450° C. The quality of wax (higher, medium, or lower melting point wax) that is generated depends on the residence time of the molten polymeric material within the reaction zone. When operating in a continuous system depending on the flowrate of the extruder or gear pump residence times vary from 1-120 minutes, preferably 5-60 minutes, with 1-12 reactor modules attached in series. In some of these embodiments, the supply and heating of the polymeric feed material is affected by a combination of an extruder and a pump, wherein the material discharged from the extruder is supplied to the pump. In some of these embodiments, extruder 106 is a 10 HP, 1.5 inch (3.81 cm) Cincinnati Milacron Pedestal Extruder, Model Apex 1.5, and the pump 110 is sized at 1.5 HP for a 1.5 inch (3.81 cm) line.

A pressure transducer PT01 monitors for plugs within the extruder (as well as prior to PT02, see below) for maintaining system pressure below a maximum pressure (namely, the maximum design pressure of the reactor 100). Likewise, pressure transducer PT02 monitors for plugs elsewhere within the system. Over-pressure is controlled by feedback from the pressure transmitted by PT01 and PT02 to a controller which transmits a command signal to shut down the extruder 106 and the pump 110, and thereby prevent the pressure from further increasing.

In some embodiments, reactor 100 is first reactor 100, and the reaction zone of the first reactor is a first reaction zone, and the flowing of the molten polymeric material, through the first reaction zone, is suspended (such as, for example, discontinued).

When "P" is equal to one, the modifying includes connecting a total number of "R" of the "N−1" reactor modules, which have not been used in the assembly of the first reactor, to the first reactor, in which "R" is a whole number from 1 to "N−1", such that another reactor is added and includes a total number of "R+1" reactor modules that are connected to one another, in series, and such that the another reactor includes a second reaction zone including "R+1" module reaction zones. Then another reactor is configured to conduct a flow of molten polymeric material, such that flowing of the reactor-disposed molten polymeric material through the second reaction zone affects generation of another depolymerization product material and its discharge from the another reactor.

When "P" is a whole number that is greater than or equal to two, but less than or equal to "N−1", the modifying includes either one of:

(a) removing a total number of "Q" of the "P" reactor modules from the first reactor, wherein "Q" is a whole number from one to "P−1", such that another reactor is added and includes a total number of "P−Q" reactor modules that are connected to one another, in series, and such that the another reactor includes a second reaction zone including "P−Q" module reaction zones, wherein the another reactor is configured to conduct a flow of molten polymeric material, such that flowing of the reactor-disposed molten polymeric material through the second reaction zone affects generation of another depolymerization product material and its discharge from the another reactor, or (b) connecting a total number of "R" of the "N−P" reactor modules, which have not been employed in the assembly of the first reactor, to the first reactor, wherein "R" is a whole number from 1 to "N−P", such that another reactor is added and includes a total number of "P+R" reactor modules that are connected to one another, in series, and also includes a second reaction zone including "P+R" module reaction zones, wherein the another reactor is configured to conduct a flow of molten polymeric material, such that flowing of the reactor-disposed molten polymeric material through the second reaction zone affects generation of another depolymerization product material and its discharge from the another reactor.

When "P" is equal to "N", the modifying includes removing a total number of "Q" of the "P" reactor modules from the first reactor, wherein "Q" is a whole number from one to "P−1", such that another reactor is added and includes a total number of "P−Q" reactor modules that are connected to one another, in series, and such that the another reactor includes a second reaction zone, including "P−Q" module reaction zones. The another reactor is configured to conduct a flow of molten polymeric material, such that flowing of the reactor-disposed molten polymeric material through the second reaction zone affects generation of another depolymerization product material and its discharge from the another reactor.

In some embodiments, after the modifying of the first reactor to affect creation of another reactor (by either one of connecting/adding or removing reactor modules), another reactor is employed to generate a second depolymerization product material. In this respect, polymeric material is heated to generate a molten polymeric material, and the molten polymeric material is flowed through the second reaction zone, to affect generation of a second depolymerization product material. The second depolymerization product material is then collected from the reactor.

In some embodiments, the same catalyst material is disposed within each one of the "N" reactor modules.

In some embodiments, the reaction zone of each one of the "N" reactor modules is the same or substantially the same.

Figure 3:
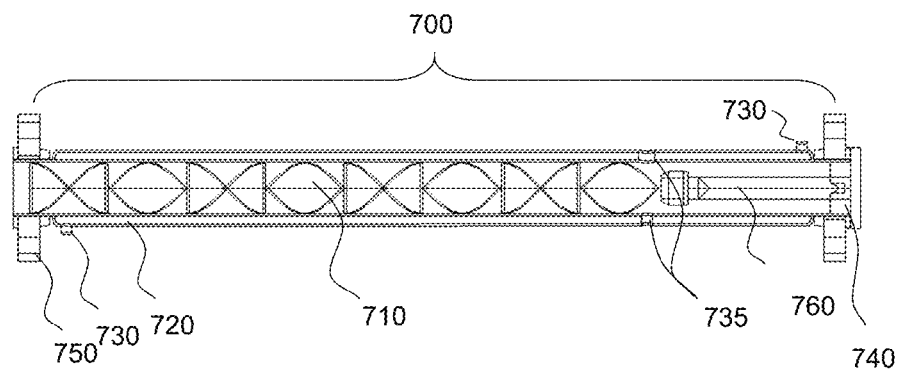
FIG. 3 is a cross-sectional side elevation view of a catalytic reactor with a removable static mixer configured to be heated via thermal fluid/molten salt.

FIG. 3 shows a cross-section side-elevation view of catalytic reactor 700 with removable static mixer 710 configured to be heated via thermal fluid and/or molten salt. Static mixer 710 provides greater mixing in catalytic reactor 700 and can result in the need of a lower operating temperature. In other embodiments, catalytic reactor 700 can include an annular insert. In other embodiments, catalytic reactor 700 can have empty internals. In certain embodiments, catalytic reactor 700 employs electric heating.

The tubular configuration of catalytic reactor 700 offers several advantages in addition to those already mentioned. In particular, use of tubular reactors connected in series allows for dependable and consistent parameters, which allows for a consistent product. Specifically, a consistent flow through the tubular sections produces a more predictable and narrow range of end products than would be produced using a continuous stirred reactor, as the surface area of the catalyst and heat input is maximized. One advantage over continuous stirred reactors is elimination of shortcutting, flow in tubular section hypothetically moves as a plug. Each hypothetical plug spends the same amount of time in the reactor. Tubular catalytic reactors can be operated vertically, horizontally, or at any angle in between. Tubular catalytic reactors (the reactor sections) and the corresponding pre-heat sections and cooling sections can be a universal size or one of several standard sizes. This allows not only for a consistent flow of the material, but also allows for tubular elements to be designed to be interchangeable among the various section and easily added, removed, cleaned, and repaired. In at least some embodiments, the inner face of the tubular sections is made of 304 or 316 steel.

The thermal fluid and/or molten salt can enter jacket 720 via inlet/outlets 730. In some embodiments, catalytic reactor 700a is configured to be mounted with a thermocouple/pressure transducer (not shown) and includes relevant notches 735. Notches 735 are employed to bring the thermocouple/pressure transducer in physical contact with the fluid. In some embodiments, the thermocouple/pressure transducer can be mounted in a well, which reduces the material in-between the fluid and the sensor.

In some embodiments, catalytic reactor 700 includes removable screen 760 that can hold the catalyst. Removable screen 760 can be easily replaced overcoming disadvantages associated with packed bed reactors, including thermal gradients and challenging maintenance requirements and resulting downtime. In some embodiments, the standardization of removable screen 760 results in a consistent product leaving each section and/or allows for standardization across multiple reactors.

In other or the same embodiments, catalytic reactor 700a can include removable adaptor 740 with cut-outs for static mixer supports. Static mixer supports reduce the force on static mixers 710 allowing for more forceful/rapid removal. The cut-outs of adaptor 740 improve the seal between the adapter and the screens. Catalytic reactor 700a can include flanges 750 on one or both ends to connect catalytic reactor 700a to other reactors, extruders or the like.

Figure 4:
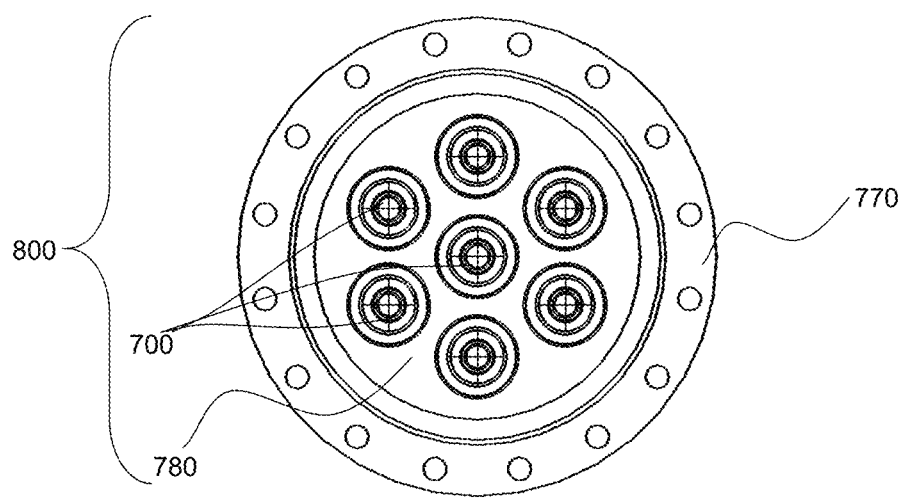
FIG. 4 is a cross-sectional front elevation view of a group of catalytic reactors of the type shown in FIG. 3, arranged in parallel.

FIG. 4 is a cross-section front-elevation view of a group of catalytic reactors 700 like the one shown in FIG. 3 arranged in parallel. Parallel arrangements allow for the total rate of production to be more readily increase/decreased as desired with minimal changes to the overall arrangement and allow multiple different levels of depolymerization to occur at once.

Housing 800 allows catalytic reactors 700 to be bathed in thermal oil/molten salt which is often more effective than electric. The thermal oil/molten salt is contained in chamber 780. In some embodiments, flange 770 allows for multiple housings to be joined together.

Figure 5:
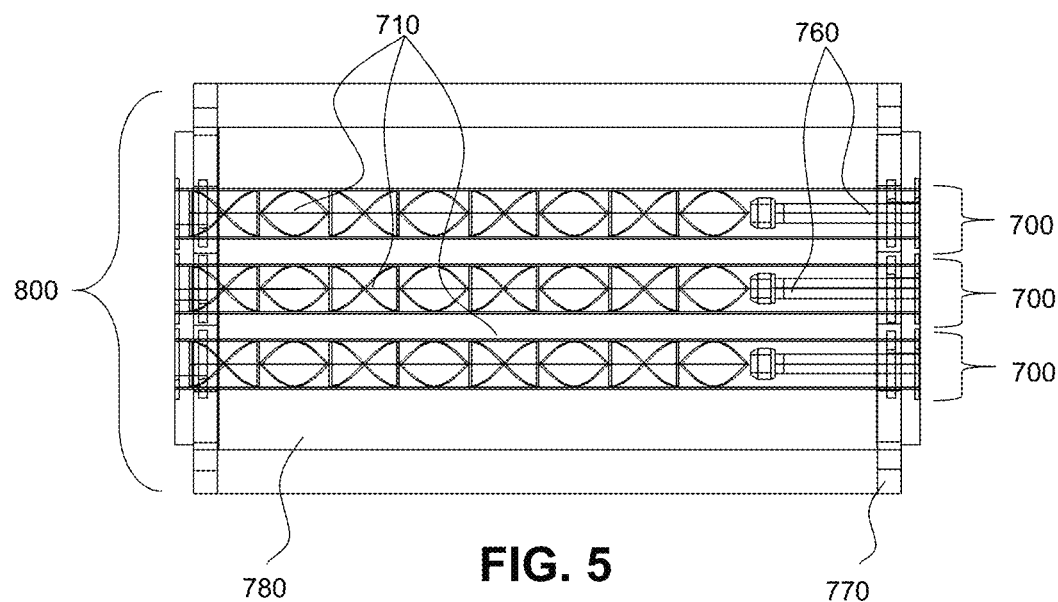
FIG. 5 is a cross-sectional side elevation view of the parallel catalytic reactor arrangement of FIG. 4 show in a horizontal configuration.

FIG. 5 is a cross-section side-elevation view of the parallel catalytic reactor arrangement of FIG. 3 shown in a horizontal configuration. Parallel arrangement allows for higher flowrate units to be built with smaller pressure drops that could cause issues as compared to a single tube arrangement. Horizontal configurations are often more convenient to operate/maintain. The parallel catalytic reactor arrangement can also be oriented in a vertical configuration.

Figure 6:
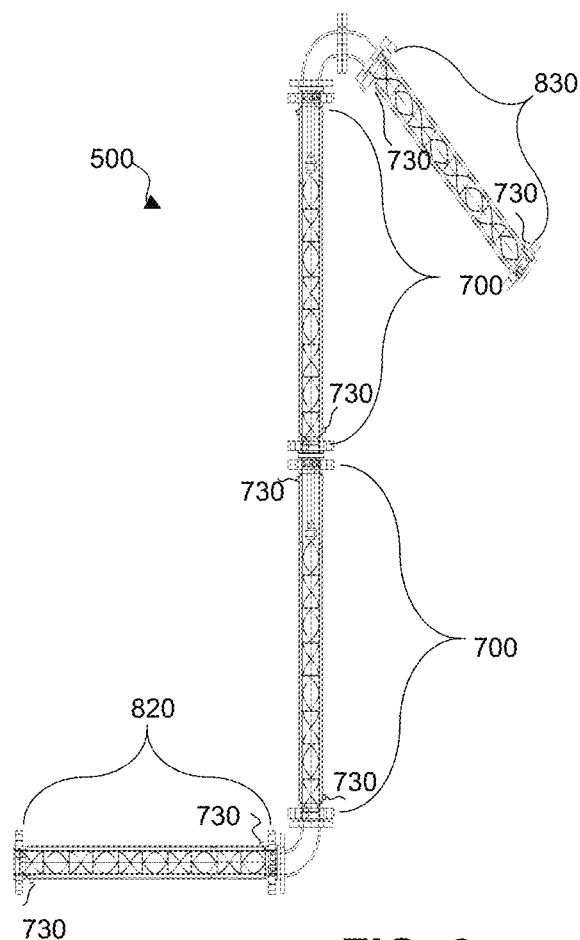
FIG. 6 is a cross-sectional side elevation view of a vertical helical internal catalytic reactor arrangement with two reactors connected in series.

FIG. 6 is a cross-section side-elevation view of vertical helical internal catalytic reactor arrangement 500 with two reactors 700 like the one shown in FIG. 3 connected in series. Horizontal helical mixer pre-heat section 820 is connected to one reactor 700. Helical mixers can lead to better mixing by avoiding stagnancies and hot spots.

Helical mixer cooling segment 830 is shown connected to the other reactor 700 at a 45° decline. The decline allows for the product to flow via gravity, while the 45° angle allows for sufficient contact between the cooling medium and the product.

In the embodiments shown, vertical helical internal catalytic reactor arrangement 500 has several inlets/outlets to allow for the use of thermal fluid/molten salt mixtures however other warming techniques (such as, but not limited to, electric heating) can be employed as well. In other embodiments, annular catalytic reactor and/or reactors with empty internal volumes can be employed. In the same or other embodiments, electric heating can be employed to heat reactor 700.

Figure 7:
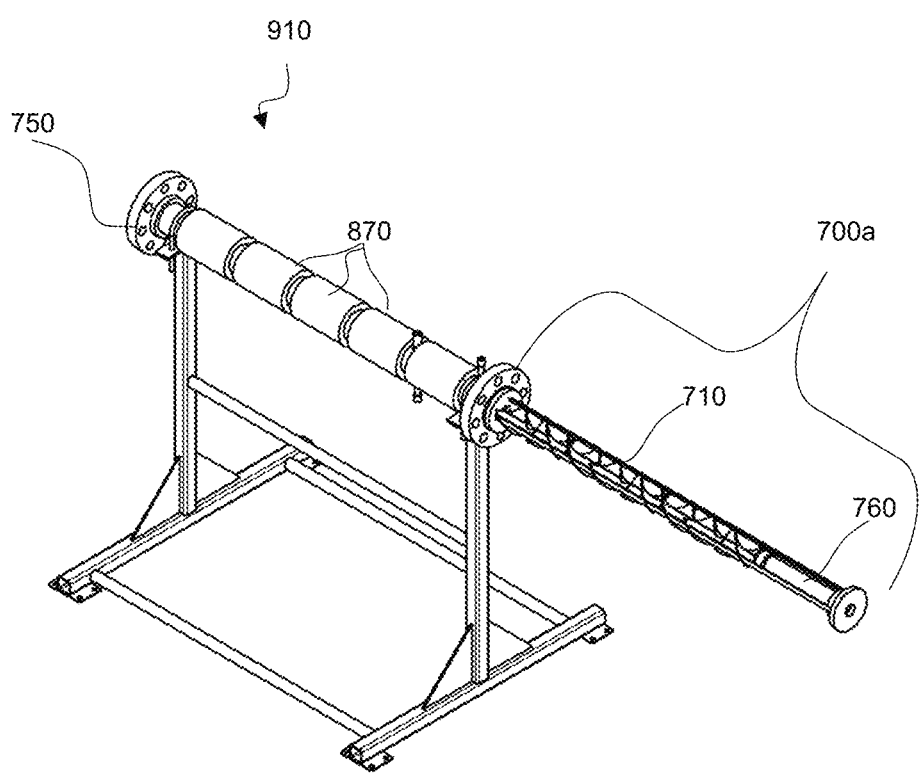
FIG. 7 is a perspective view of a horizontal reactor with an internal helical mixer.

FIG. 7 is a perspective view of horizontal reactor configuration 910 with internal helical reactor 700 configured to employ electric heaters 870 like the one shown in FIG. 3. In FIG. 7 the reactor shell has been removed from part of horizontal reactor configuration 910 to aid in visualizing the location of internal helical reactor 700

Specific Examples of Plastics Modified by Synthetic Waxes

TABLE 1

Materials Used

| Ingredient | Grade/Type | Source |
|---|---|---|
| Control Plastic | Clean PCR Pellet (HDPE milk jugs) | KW Plastics |
| Wax A | AW125 | Applicant |
| Wax B | AW105LV | Applicant |

Example 1

In a first illustrative embodiment of the present process, wax was produced from the depolymerization of post-consumer polyethylene. Various percentages of the wax (by weight of the wax) were mixed with a recycled plastic (HDPE clear milk jugs). The melt flow rate of the resulting products was increased, leading to greater output.

In the above embodiment, blending/extrusion was conducted on a TEC 1.5" single screw extruder. Melt flow index testing was conducted on an Arburg Injection Machine with a 3 MM plaque mold. Barrel diameter was 9.5320 mm, die length was 8.015 mm, and orifice diameter was 2.09 mm. A six-minute preheat was utilized. Melt Flow index testing was conducted per ASTM D1238: Standard Test Method For Flow Rates Of Thermoplastics at 190° C. and 2.16 Kg Load.

The preparation and testing of the blends in Example 1-3 were as follows.

(1) The materials were blended with waxes to create the following mixtures
Control (100% Control Plastic)
Mixture A (92% Control Plastic with 8% Wax A)
Mixture B (92% Control Plastic with 8% Wax B)
Mixture C (98% Control Plastic with 2% Wax A)

(2) The mixtures were extruded into pellets (screen pack start 40/100/40)

(3) The pressure, temperatures, and throughput (time to weight) were recorded.

(4) Amps were recorded every 10 minutes.

(5) The final extruded mixtures were tested for melt flow.

Figure 8:
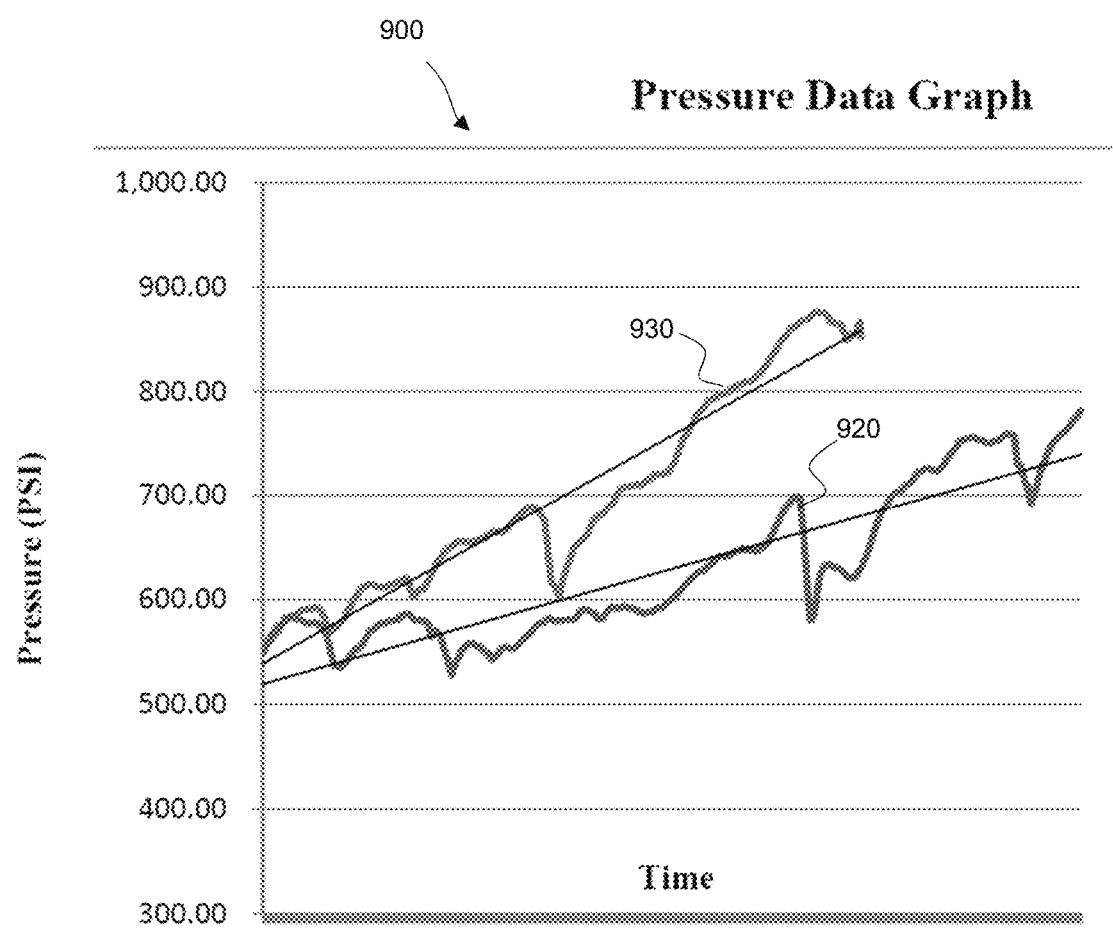
FIG. 8 is a graph illustrating the decrease in amount of pressure required to push wax-modified polymeric material through an extruder when compared to a non-modified polymeric material.

Graph 900 in FIG. 8 illustrates the decrease in amount of pressure required to push the wax-modified polymeric material 920 through an extruder when compared to a non-modified polymeric material 910.

TABLE 2

Wax Modified Polymer Results (Example 1)

| Property | Control | Mixture A | Mixture B | Mixture C |
|---|---|---|---|---|
| Incoming Material Moisture (%) | 0.0048 | N/A | N/A | N/A |
| Incoming Material Melt Flow Rate (g/10 mins) | 0.604 | N/A | N/A | N/A |
| Pre Extrusion Parts Moisture (%) | 0.0071 | 0.0074 | 0.0079 | 0.0189 |
| Pre Extrusion Parts Melt Flow Rate (g/10 mins) | 0.563 | 0.759 | 0.767 | 0.590 |
| Pellet Material Moisture (%) | 0.0051 | 0.0062 | 0.0064 | 0.0029 |
| Pellet Material Melt Flow Rate (g/10 mins) | 0.622 | 0.954 | 0.916 | 0.639 |
| Throughput (lbs/hour) | 31.4 | 38.2 | 39.3 | 36.1 |
| Percent Increase in Throughput vs. Control | N/A | 22 | 25 | 11 |
| Average Temperature (° C.) | 214.6 | 218 | 216 | 211.9 |
| Average (PSI) | 852.46 | 736.16 | 777.95 | 629.43 |
| Percent Reduction in Pressure vs Control | N/A | −14 | −9 | −10 |

Example 2

In Example 2, a polyethylene wax was mixed in different ratios (1%, 3%, 5%) with HDPE polymer. It was found that increasing the quantity of wax resulted in an increase in the melt flow index of the wax/polymer mixture.

In one embodiment the initial HDPE had an initial melt flow index (MFI) of 0.40 grams/10 minutes (following ASTM D1238). The HDPE was then converted into a polyethylene wax, and was mixed into the same HDPE at a concentration of 1 wt %. The MFI of the HDPE/wax mixture was increased to 0.42 grams/10 minutes.

In another embodiment, the initial HDPE was mixed with the polyethylene wax at a concentration of 5 wt %. The MFI of the HDPE/wax mixture was increased to 0.53 grams/10 minutes.

In the above embodiments, blending/extrusion was conducted on a Merritt-Davis 2" extruder. Melt flow index testing was conducted on a Goettfert Melt Indexer. Barrel diameter was 9.5320 mm, die length was 8.015 mm, and orifice diameter was 2.09 mm. A six-minute preheat was utilized. Melt Flow index testing was conducted per ASTM D1238: Standard Test Method For Flow Rates Of Thermoplastics at 190° C. and 2.16 Kg Load.

TABLE 3

Melt Flow Index Results (Example 3)

| Sample | Melt Flow Index (g/10 min) |
|---|---|
| Control | 0.40 |
| 1% wax A | 0.42 |
| 3% wax A | 0.45 |
| 5% wax A | 0.53 |

Example 4

In Example 4, a polyethylene wax (applicant's A120) was mixed in different ratios (2% and 4%) with a post consumer regrind high-density polyethylene natural bottle flake (PCR HDPE) supplied by Envision. It was found that increasing the quantity of wax resulted in an increase in the elongation average. Test were conducted with both controlled screw speed (125 revolution per minute) and under controlled pressure (~125 bar).

TABLE 4

Commercial Extrusion Evaluation Trial Run Averages (Example 4)

| Sample | Average Temp (C.) | Average Pressure (bar) | Average Energy (kW) | Average Output (kg/hr) |
|---|---|---|---|---|
| Control 125 RPM | 249 | 122 | 68.482 | 131.1 |
| 2% wax D 125 RPM | 250 | 110 | 54.712 | 132.9 |
| 2% wax D 165 RPM | 248 | 126 | 72.373 | 166.0 |
| 4% wax D 125 RPM | 250 | 108 | 58.878 | 129.3 |
| 4% wax D 170 RPM | 248 | 124 | 70.295 | 167.8 |

Table 4 shows that as wax is added, the melt flow increases. Running the process at constant revolution per minute decreases pressure in the system, and the amount of energy needed compared to the control as the mixture has an increased flow rate. Keeping pressure constant increases the output relative to the control.

TABLE 5

Injection Molded Data (Example 4)

| Sample | Flexural Modulus (bar) | Pellet Melt Flow Rate (g/10 mins) | IZOD (lbf-ft/in) | Tensile at yield (bar) | Elongation Average (%) |
|---|---|---|---|---|---|
| Control | 11338 | 0.47 | 10.20 | 262 | 374 |
| 2% wax D | 11606 | 0.63 | 11.44 | 270 | 444 |
| 4% wax D | 11482 | 0.63 | 10.20 | 259 | 607 |

In one embodiment, the mixtures from Table 4 were injected into a mold. The initial PCR HDPE had an elongation average of 374%.

In one group the PCR HDPE was mixed with the polyethylene wax at a concentration of 2 wt %. The resulting PCR HDPE mixture had an elongation average of 444%.

In another group the PCR HDPE was mixed with the polyethylene wax at a concentration of 4 wt %. The resulting PCR HDPE mixture had an elongation average of 607%

The following conclusions can be drawn from the foregoing test results:

The addition of waxes derived from thermal or catalytic depolymerization of plastics have at least some of the following impacts on polymer processing or reprocessing:
- increases the melt flow index of a polymer
- higher throughput rates
- less backpressure and equipment wear
- improved internal lubrication
- strong external lubrication
- increased elongation averages when being used for injection molding Graph 900 in FIG. 8 illustrates the decrease in amount of pressure required to push the wax-modified polymeric material 920 through an extruder when compared to a non-modified polymeric material 910.

What is claimed is:

1. A modified polymer wherein said modified polymer is produced by mixing an amount of a wax with a polymer, wherein said modified polymer has an increased melt flow index when compared to said polymer,
    wherein said wax is formed by catalytically depolymerizing a polyethylene, and wherein said polymer is polyethylene or polypropylene.

2. The modified polymer of claim 1 wherein at least an amount of said polyethylene is from a recycled post-consumer or post-industrial feed.

3. The modified polymer of claim 1 wherein said wax has a melting point between 106° C. and 135° C.

4. The modified polymer of claim 1 wherein said wax has a melting point between 86° C. and 105° C.

5. The modified polymer of claim 1 wherein said wax has a melting point between 65° C. and 85° C.

6. The modified polymer of claim 1 wherein said wax has a melting point between 40° C. and 65° C.

7. The modified polymer of claim 2 wherein said amount of said polyethylene includes inorganics.

8. The modified polymer of claim 1 wherein said polymer is polyethylene.

9. The modified polymer of claim 1 wherein said polyethylene is HDPE.

10. The modified polymer of claim 1 wherein said amount of said wax is between 1-8% of said modified polymer by weight.

11. The modified polymer of claim 1 wherein said amount of said wax is between 1-5% of said modified polymer by weight.

12. The modified polymer of claim 1 wherein said amount of said wax is between 2-4% of said modified polymer by weight.

13. A modified polymer wherein said modified polymer is produced by mixing an amount of a wax with a polymer, wherein said modified polymer has an increased melt flow index when compared to said polymer,
    wherein said wax is formed by catalytically depolymerizing a polypropylene, and wherein said polymer is polyethylene or polypropylene.

14. The modified polymer of claim 13 wherein at least an amount of said polypropylene is from a recycled post-consumer or post-industrial feed.

15. The modified polymer of claim 13 wherein said amount of said polypropylene includes inorganics.

16. The modified polymer of claim 13 wherein said polymer is polypropylene.

17. The modified polymer of claim 13 wherein said amount of said wax is between 1-8% of said modified polymer by weight.

18. The modified polymer of claim 13 wherein said amount of said wax is between 1-5% of said modified polymer by weight.

19. The modified polymer of claim 13 wherein said amount of said wax is between 2-4% of said modified polymer by weight.

* * * * *